US012624782B1

(12) United States Patent
Ksieski

(10) Patent No.: US 12,624,782 B1
(45) Date of Patent: May 12, 2026

(54) MULTI-DIRECTIONAL PLUMBING SYSTEM

(71) Applicant: Stephen Ksieski, Granada Hills, CA (US)

(72) Inventor: Stephen Ksieski, Granada Hills, CA (US)

( * ) Notice: Subject to any disclaimer, the term of this patent is extended or adjusted under 35 U.S.C. 154(b) by 0 days.

(21) Appl. No.: 18/947,576

(22) Filed: Nov. 14, 2024

(51) Int. Cl.
| *F16L 27/02* | (2006.01) |
| *F16L 27/04* | (2006.01) |
| *F16L 27/08* | (2006.01) |

(52) U.S. Cl.
CPC ........... *F16L 27/023* (2013.01); *F16L 27/042* (2013.01); *F16L 27/0845* (2013.01)

(58) Field of Classification Search
CPC ... F16L 27/023; F16L 27/042; F16L 27/0845; F16L 41/007
USPC ........................................................ 285/184
See application file for complete search history.

(56) References Cited

U.S. PATENT DOCUMENTS

| 327,877 | A | * | 10/1885 | Hodges | ............... | F16L 27/0849 |
| | | | | | | 285/184 |
| 1,067,642 | A | * | 7/1913 | Byam | ................. | F16L 27/0849 |
| | | | | | | 285/264 |

| 5,064,226 | A | * | 11/1991 | Klas | ..................... | H02G 3/0616 |
| | | | | | | 285/423 |
| 6,561,549 | B1 | * | 5/2003 | Moris | ................. | F16L 27/0849 |
| | | | | | | 285/272 |
| 6,746,056 | B2 | | 6/2004 | Palmer | | |
| 6,932,390 | B1 | * | 8/2005 | Gretz | ................... | H02G 3/0481 |
| | | | | | | 285/272 |
| 10,746,332 | B1 | | 8/2020 | Haines | | |
| 10,982,802 | B2 | | 4/2021 | Fujiwara | | |
| 2005/0012329 | A1 | | 1/2005 | Brown | | |

FOREIGN PATENT DOCUMENTS

| AU | 2009213048 | 3/2011 |
| CN | 11084486 | 2/2020 |
| FR | 2527244 | 3/1982 |
| KR | 20170038591 | 9/2015 |

* cited by examiner

*Primary Examiner* — James M Hewitt, II

(57) ABSTRACT

Disclosed is a multi-directional plumbing system having both a male and female fitting. The female fitting is formed to selectively connect with the male fitting and allow for rotation therebetween to the desired angle. Each of the male and female fittings have distal ends shaped like male fittings to allow for connection with external fittings or pipes. Thus, in use, a user can affix the fittings with external pipes and rotate and affix the male and female fittings at the desired angle to accommodate a variety of installation scenarios.

7 Claims, 21 Drawing Sheets

100

100

1
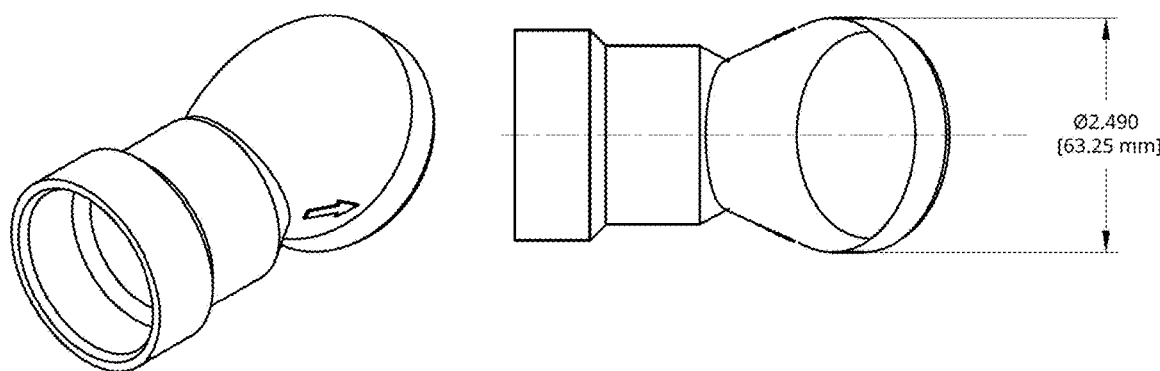
FIG. 1H                    FIG. 1I
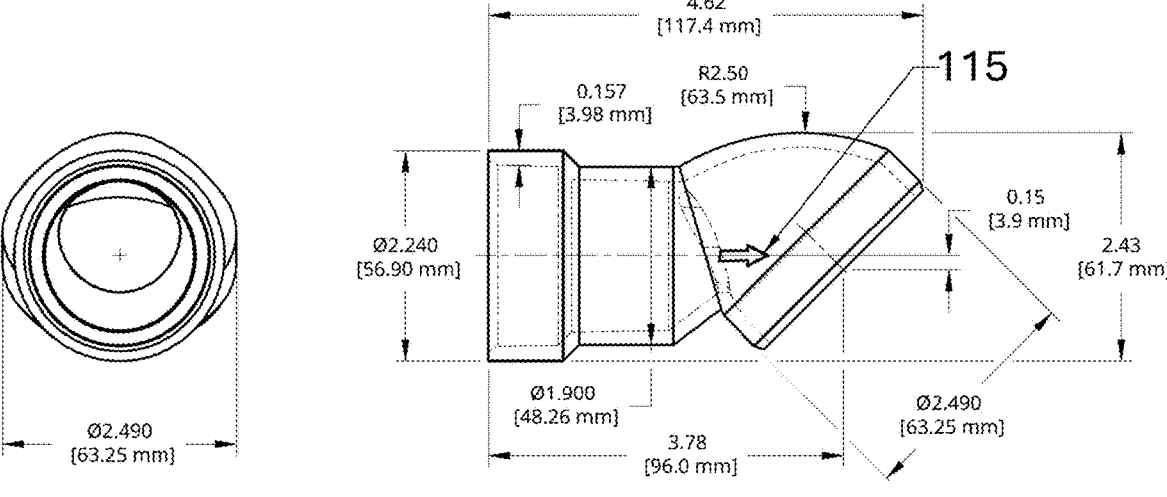
FIG. 1J                    FIG. 1K

2

2

<u>100</u>

1
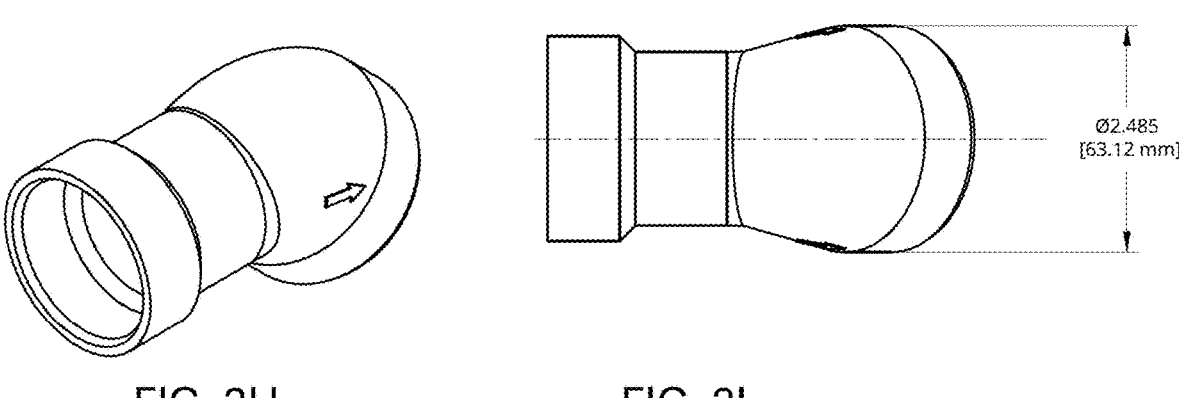
FIG. 2H                    FIG. 2I
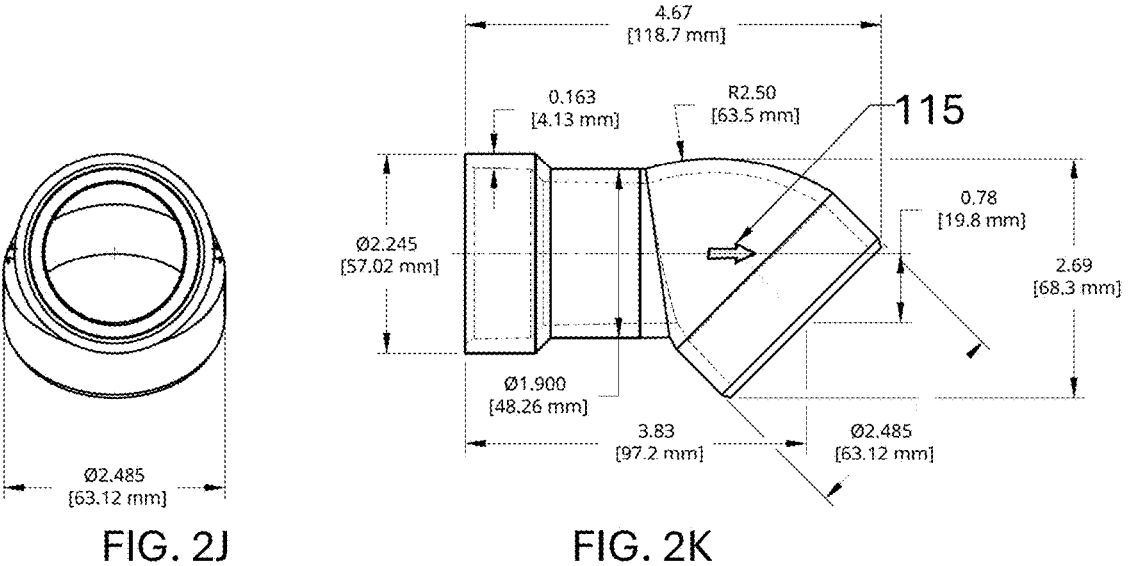
FIG. 2J                    FIG. 2K

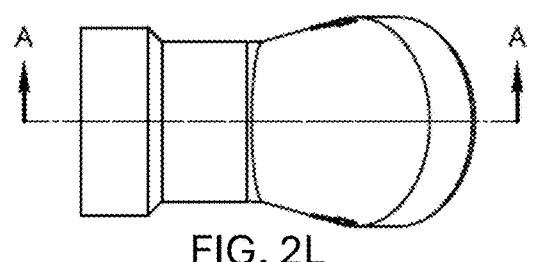
FIG. 2L
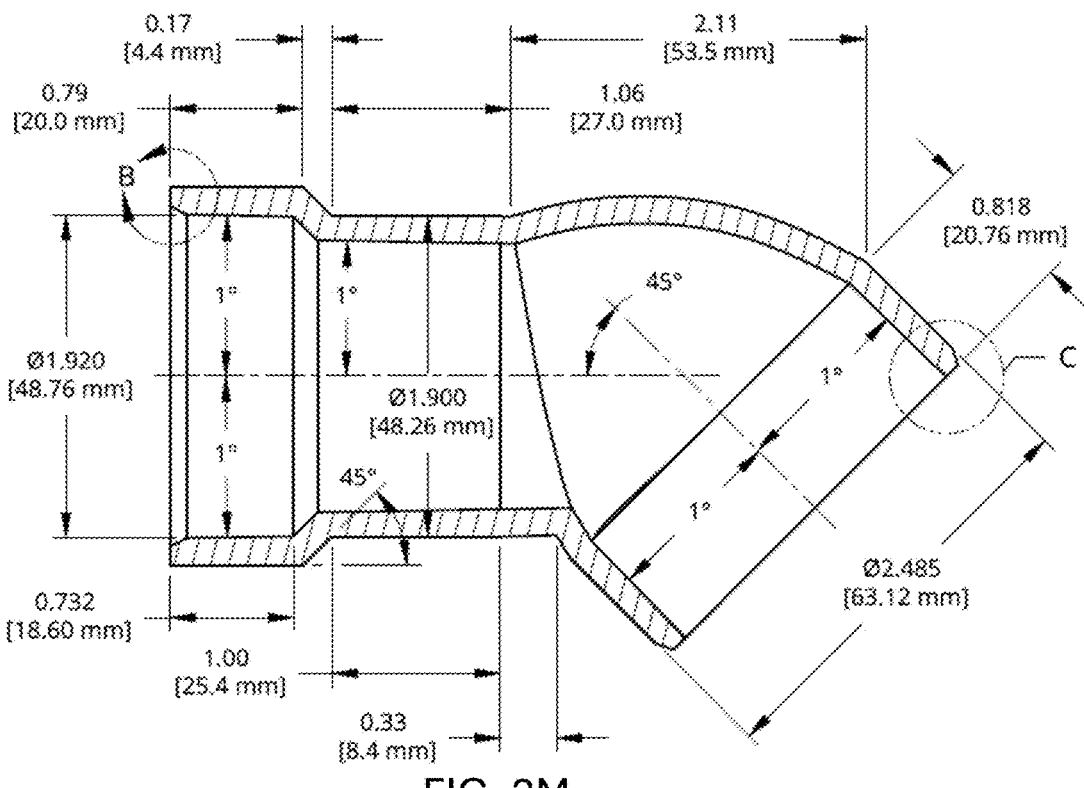
FIG. 2M
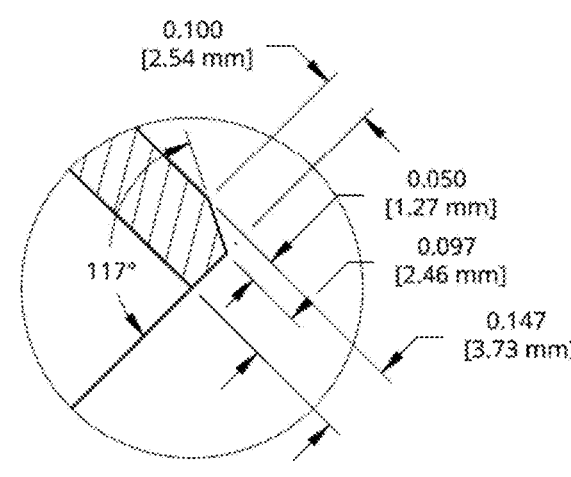
FIG. 2N        FIG. 2O

2
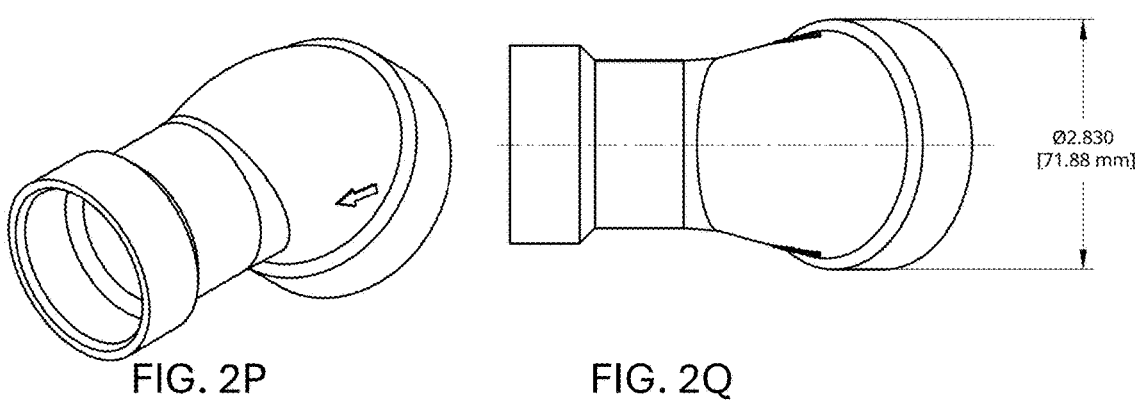
FIG. 2P                    FIG. 2Q
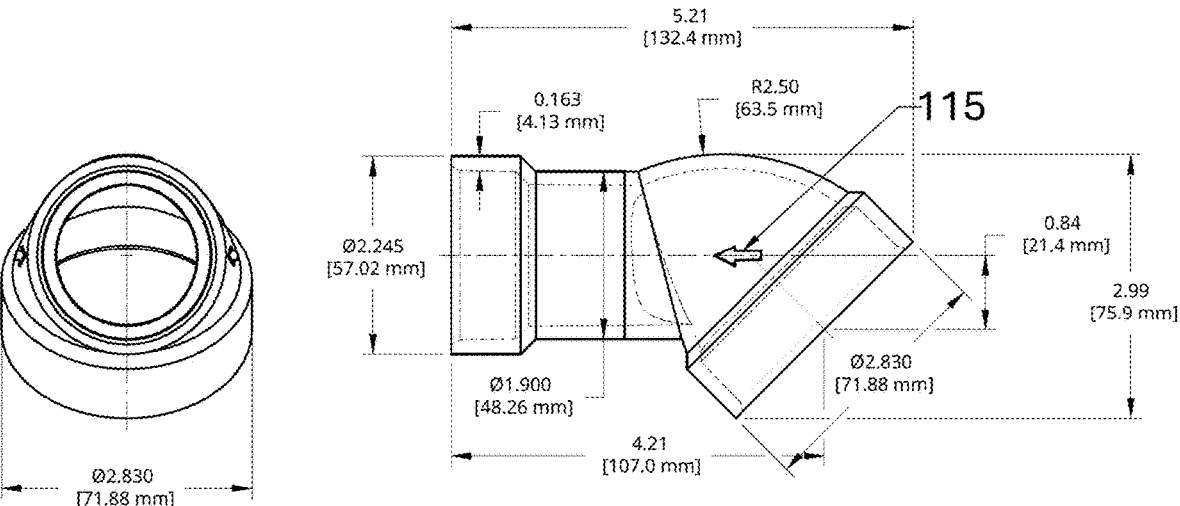
FIG. 2R                    FIG. 2S 2
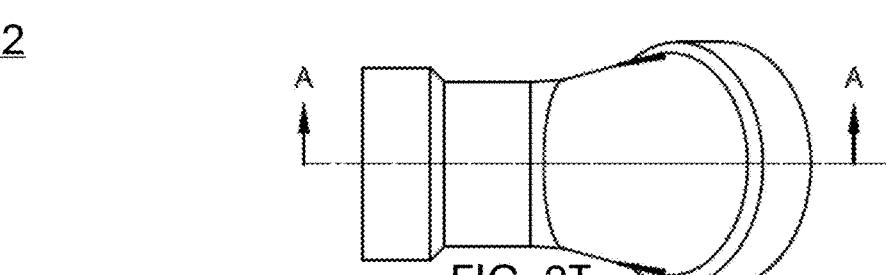
FIG. 2T
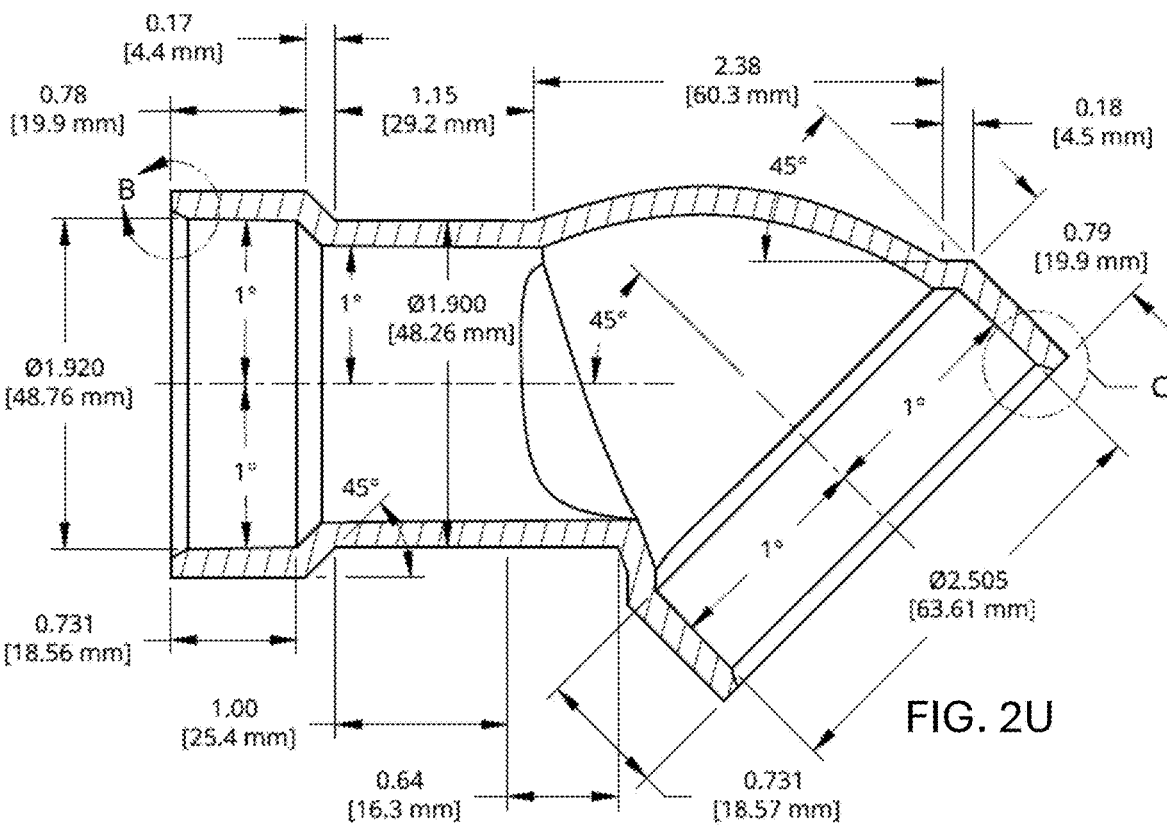
FIG. 2U
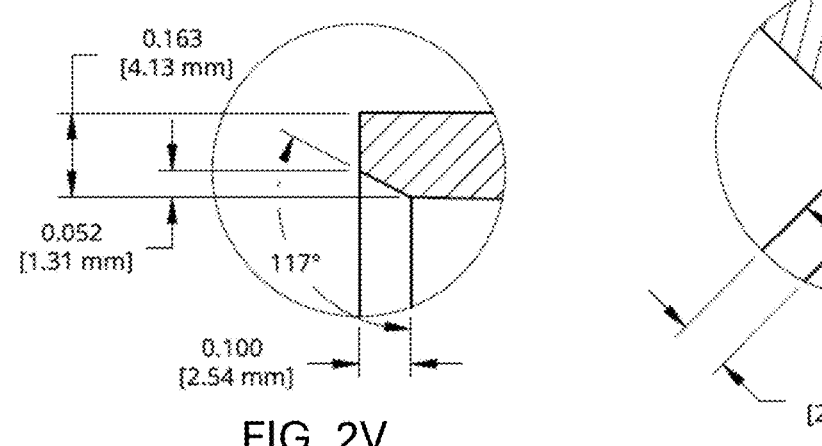
FIG. 2V
FIG. 2W

1
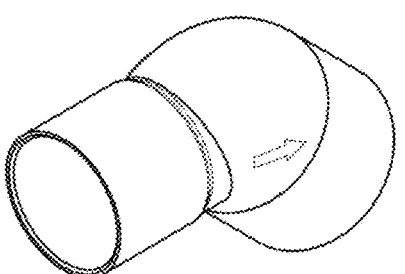
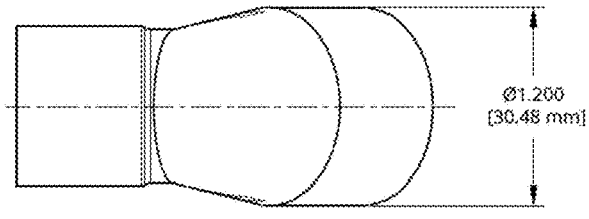
FIG. 3H            FIG. 3I
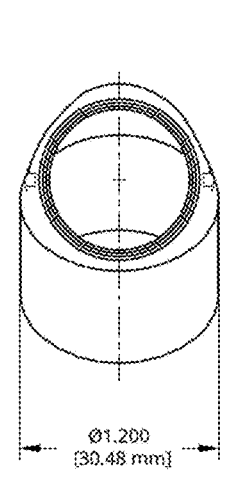
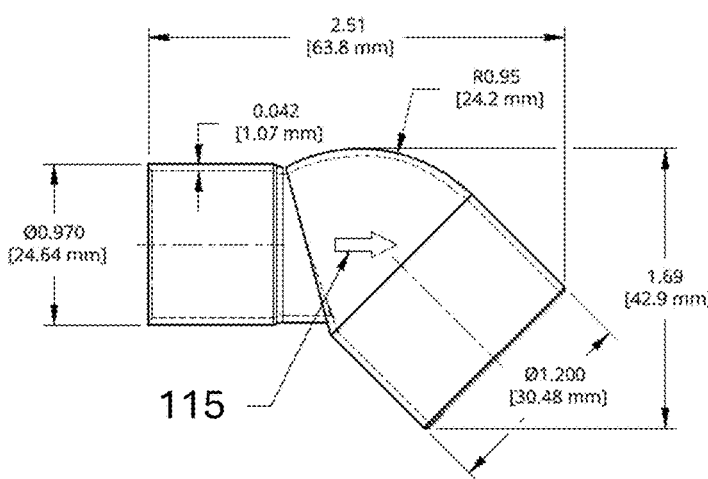
FIG. 3J            FIG. 3K

2

115

2

1

MULTI-DIRECTIONAL PLUMBING SYSTEM

BACKGROUND OF THE INVENTION

(1) Field of Invention

The present invention relates to plumbing fittings and, more specifically, to a multi-directional plumbing system with fittings designed to address the limitations of traditional fittings, which restrict piping configurations to linear, 45-degree, and 90-degree angles.

(2) Description of Related Art

Conventional plumbing fittings are generally limited to fixed angles such as straight, 45-degree, or 90-degree configurations. These limitations force installers to carry and utilize multiple fittings and adapters to create non-standard angles, resulting in increased material costs, labor time, and potential leak points. In complex piping installations, these limitations can lead to inefficient layouts and difficulties in achieving optimal alignment in tight or irregular spaces.

Thus, a continuing need exists for a new and improved multi-directional plumbing system.

SUMMARY OF INVENTION

The present disclosure provides a multi-directional plumbing system having both a male and female fitting. The male fitting includes: a first distal end shaped as a female coupling; a first neck extending from the first distal end; a first coupling section transitioning from the neck to a first proximal end, the first proximal end being shaped as a male coupling; wherein a first longitudinal axis passes through a center of the neck; wherein a first end axis passes through the first proximal end and crosses the first longitudinal axes such that a first coupling angle exists between the first longitudinal axis and the first end axis; and wherein the first coupling angle is approximately 45 degrees.

Similarly, the female fitting includes: a second distal end shaped as a female coupling; a second neck extending from the second distal end; a second coupling section transitioning from the second neck to a second proximal end, the second proximal end being shaped as a female coupling; wherein a second longitudinal axis passes through a center of the second neck; wherein a second end axis passes through the second proximal end and crosses the second longitudinal axes such that a second coupling angle exists between the second longitudinal axis and the second end axis; and wherein the second angle is approximately 45 degrees.

In another aspect, the first proximal end and second proximal end are connectable, such that when connected, the male fitting is rotatable with respect to the female fitting.

In yet another aspect, the male fitting is rotatable with respect to the female fitting such that an angle between the first longitudinal axis and second longitudinal axis is adjustable between 90 degrees and 180 degrees.

Additionally, each of the first proximal end and second proximal end include a center point, such that when connected, the center points lay together and are aligned with the first and second longitudinal axes.

In yet another aspect, the male fitting is rotatable with respect to the female fitting to form a linear orientation such that the first longitudinal axis and second longitudinal axis are aligned with one another.

Further, each of the first neck and second neck are elongated necks having a length between one half an inch and two inches.

In yet another aspect, each of the first proximal end and second proximal end include a center point, such that when connected, the center points lay together while offset from the first and second longitudinal axes.

In another aspect, each of the first neck and second neck are truncated necks.

Finally, as can be appreciated by one in the art, the present invention also comprises a method for forming and using the invention as described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 1H is an elevated-view illustration of the male fitting in accordance with various embodiments of the present invention;

FIG. 1I is a top-view illustration of the male fitting in accordance with various embodiments of the present invention;

FIG. 1J is a front-view illustration of the male fitting in accordance with various embodiments of the present invention;

FIG. 1K is a side-view illustration of the male fitting in accordance with various embodiments of the present invention;

FIG. 2H is an elevated-view illustration of the male fitting in accordance with various embodiments of the present invention;

FIG. 2I is a top-view illustration of the male fitting in accordance with various embodiments of the present invention;

FIG. 2J is a front-view illustration of the male fitting in accordance with various embodiments of the present invention;

FIG. 2K is a side-view illustration of the male fitting in accordance with various embodiments of the present invention;

FIG. 2L is a top-view illustration of the male fitting;

FIG. 2M is a cross-sectional, side-view illustration of the male fitting, taken from line A-A of FIG. 2L;

FIG. 2N is a close-up illustration of Detail B, taken from FIG. 2M;

FIG. 2O is a close-up illustration of Detail C, taken from FIG. 2M;

FIG. 2P is an elevated-view illustration of the female fitting in accordance with various embodiments of the present invention;

FIG. 2Q is a top-view illustration of the female fitting in accordance with various embodiments of the present invention;

FIG. 2R is a front-view illustration of the female fitting in accordance with various embodiments of the present invention;

FIG. 2S is a side-view illustration of the female fitting in accordance with various embodiments of the present invention;

FIG. 2T is a top-view illustration of the male fitting;

FIG. 2U is a cross-sectional, side-view illustration of the male fitting, taken from line A-A of FIG. 2T;

FIG. 2V is a close-up illustration of Detail B, taken from FIG. 2U;

FIG. 2W is a close-up illustration of Detail C, taken from FIG. 2U;

FIG. 3D is a cross-sectional, side-view illustration of the multi-directional plumbing system, taken from line A-A of FIG. 3C;

FIG. 3H is an elevated-view illustration of the male fitting in accordance with various embodiments of the present invention;

FIG. 3I is a top-view illustration of the male fitting in accordance with various embodiments of the present invention;

FIG. 3J is a front-view illustration of the male fitting in accordance with various embodiments of the present invention;

FIG. 3K is a side-view illustration of the male fitting in accordance with various embodiments of the present invention;

DETAILED DESCRIPTION

Figure 1A:
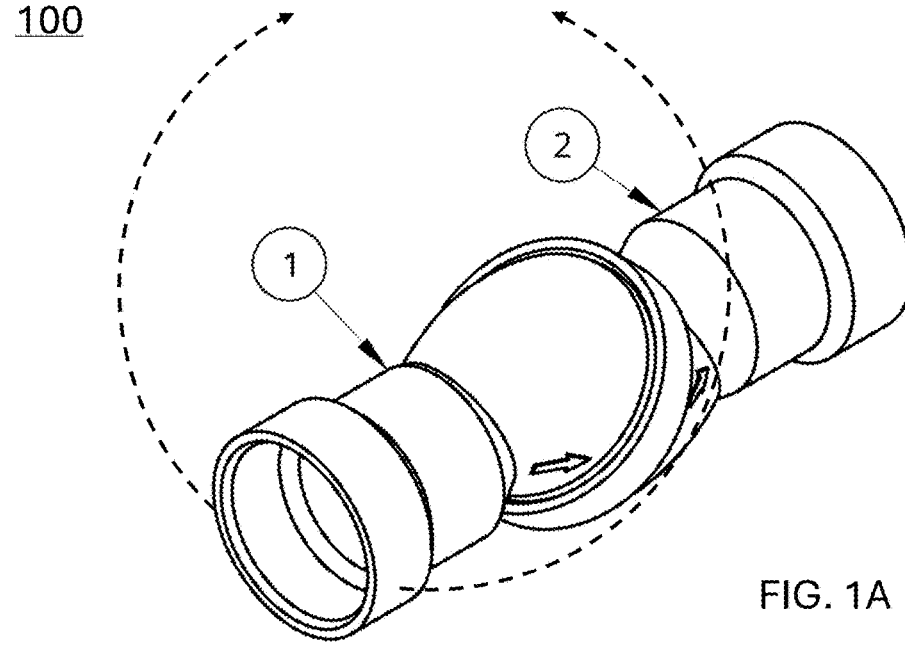
FIG. 1A is an elevated-view illustration of a multi-directional plumbing system in accordance with various embodiments of the present invention, depicting a male fitting connected with a female fitting to create a plumbing system with a linear orientation.

The present invention relates to plumbing fittings and, more specifically, to a multi-directional plumbing system designed to address the limitations of traditional fittings. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

As noted above, the present disclosure provides a versatile and multi-directional plumbing system with one or more fittings capable of achieving various angles, thus offering a flexible alternative to standard fittings. The multi-directional plumbing system is comprised of one or more adjustable fittings that can be pivoted and secured at a wide range of angles, thereby reducing the need for additional components. The invention aims to reduce material costs, simplify installation, and decrease the likelihood of leaks by minimizing joint connections while accommodating a variety of angles and settings.

The fittings of the present disclosure may be constructed from any suitable material depending on the intended application. For example, for residential and light commercial use, materials such as PVC or ABS plastic can be used. For more demanding environments, such as industrial applications, the fitting can be constructed from metals such as stainless steel, brass and copper to withstand higher pressures and temperatures. Thus, as can be appreciated by those skilled in the art, the fittings as described herein can be formed of any suitable material as appropriate given the desired application. Further details regarding the fittings are provided below.

As shown in FIGS. 1A through 3W, the multi-directional plumbing system 100 includes at least one fitting, either a male fitting 1 or a female fitting 2. Desirably, the system 100 includes both a male fitting 1 and a female fitting 2 that are formed to accommodate the multi-directional angles. Each of the male fitting 1 and female fitting 2 can be selectively affixed to other plumbing systems and pipes (using glue, wield, or any other fixture technique) and affixed to one another (using glue, wield, or any other fixture technique) at the selected angle.

Figure 1B:
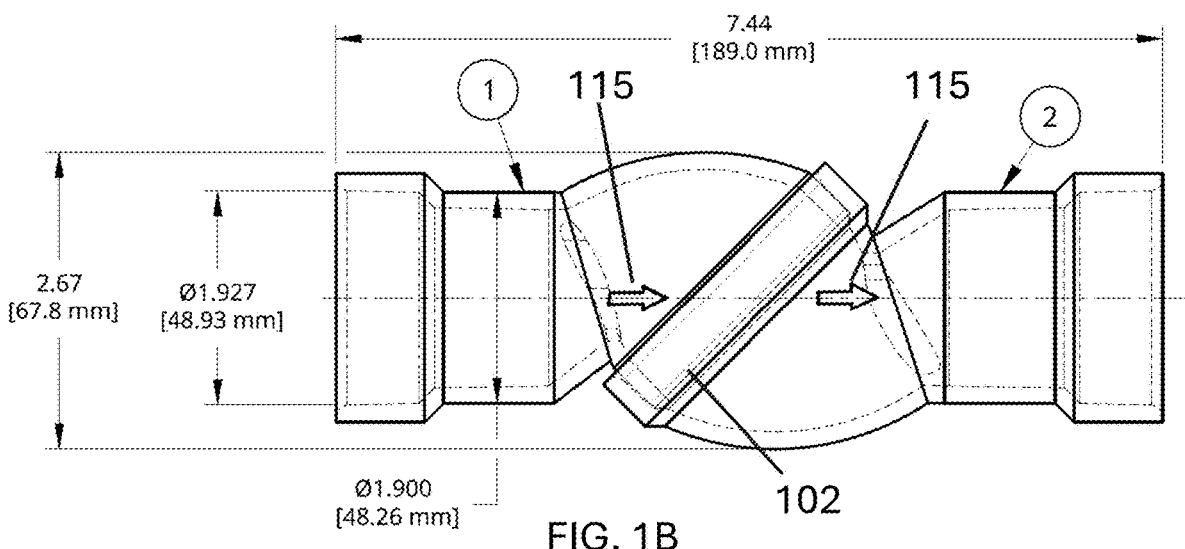
FIG. 1B is a side-view illustration of the multi-directional plumbing system in accordance with various embodiments of the present invention, depicting a male fitting connected with a female fitting to create a linear orientation.
Figure 1C:
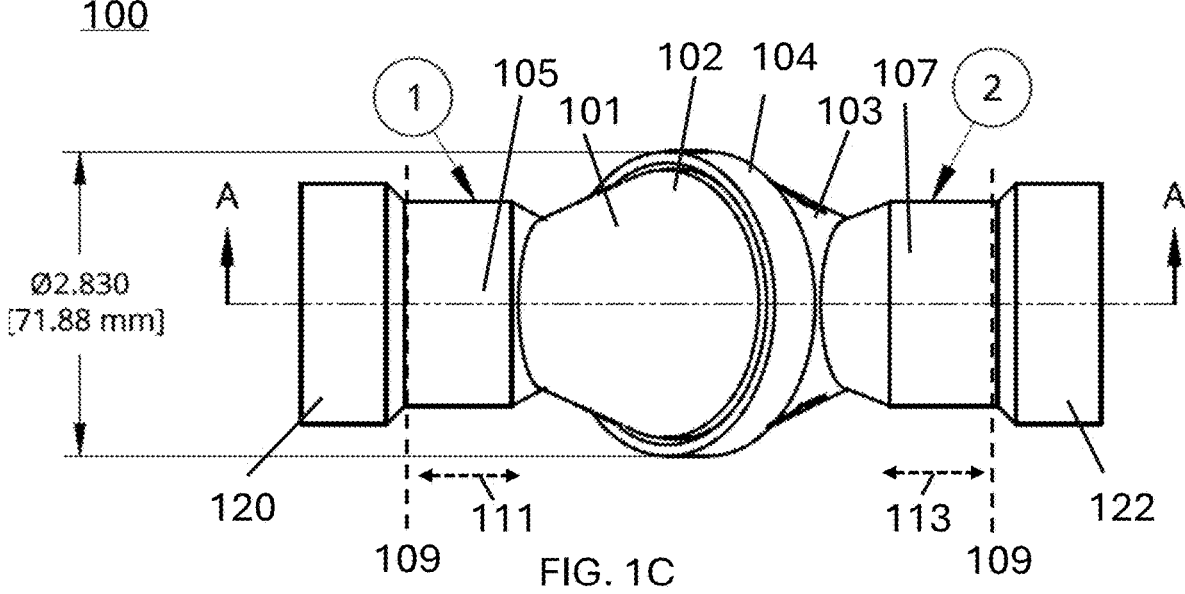
FIG. 1C is a top-view illustration of the multi-directional plumbing system in accordance with various embodiments of the present invention.
Figure 1D:
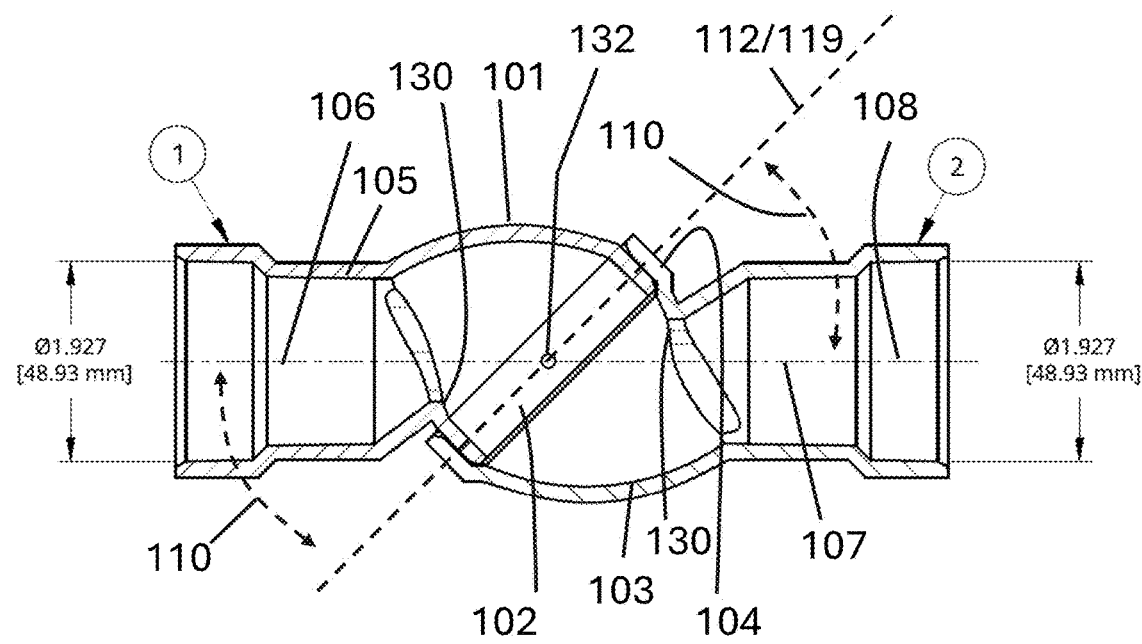
FIG. 1D is a cross-sectional, side-view illustration of the multi-directional plumbing system, taken from line A-A of FIG. 1C.
Figures 1E, 1F, 1G:
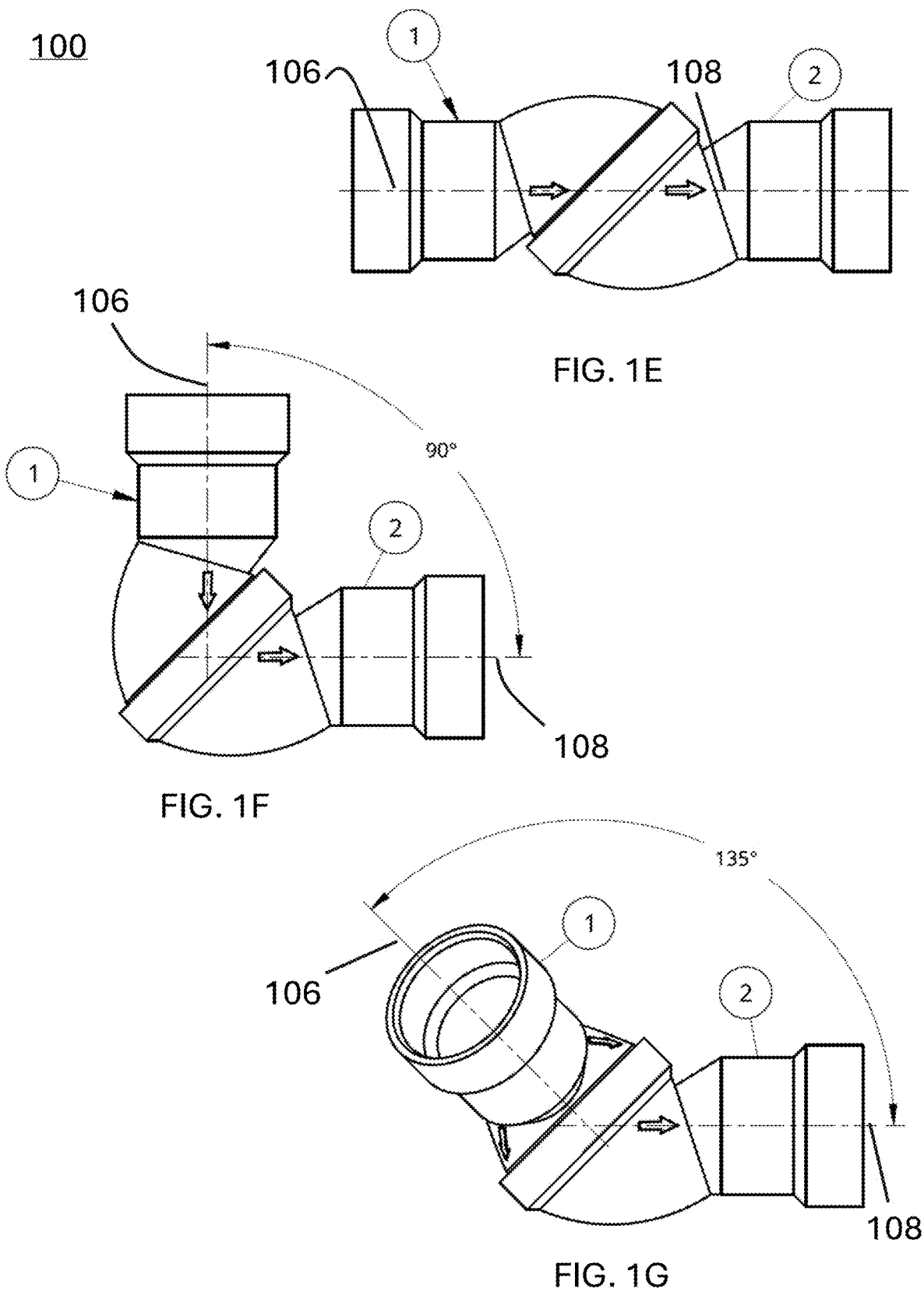
FIG. 1E is a side-view illustration of the multi-directional plumbing system, depicting the male fitting connected with the female fitting to create the linear orientation.
FIG. 1F is a side-view illustration of the multi-directional plumbing system, depicting the male fitting connected with the female fitting to create a 90 degree orientation.
FIG. 1G is a side-view illustration of the multi-directional plumbing system, depicting the male fitting connected with the female fitting to create a 135 degree orientation.
Figures 1L, 1M, 1N, 1O:
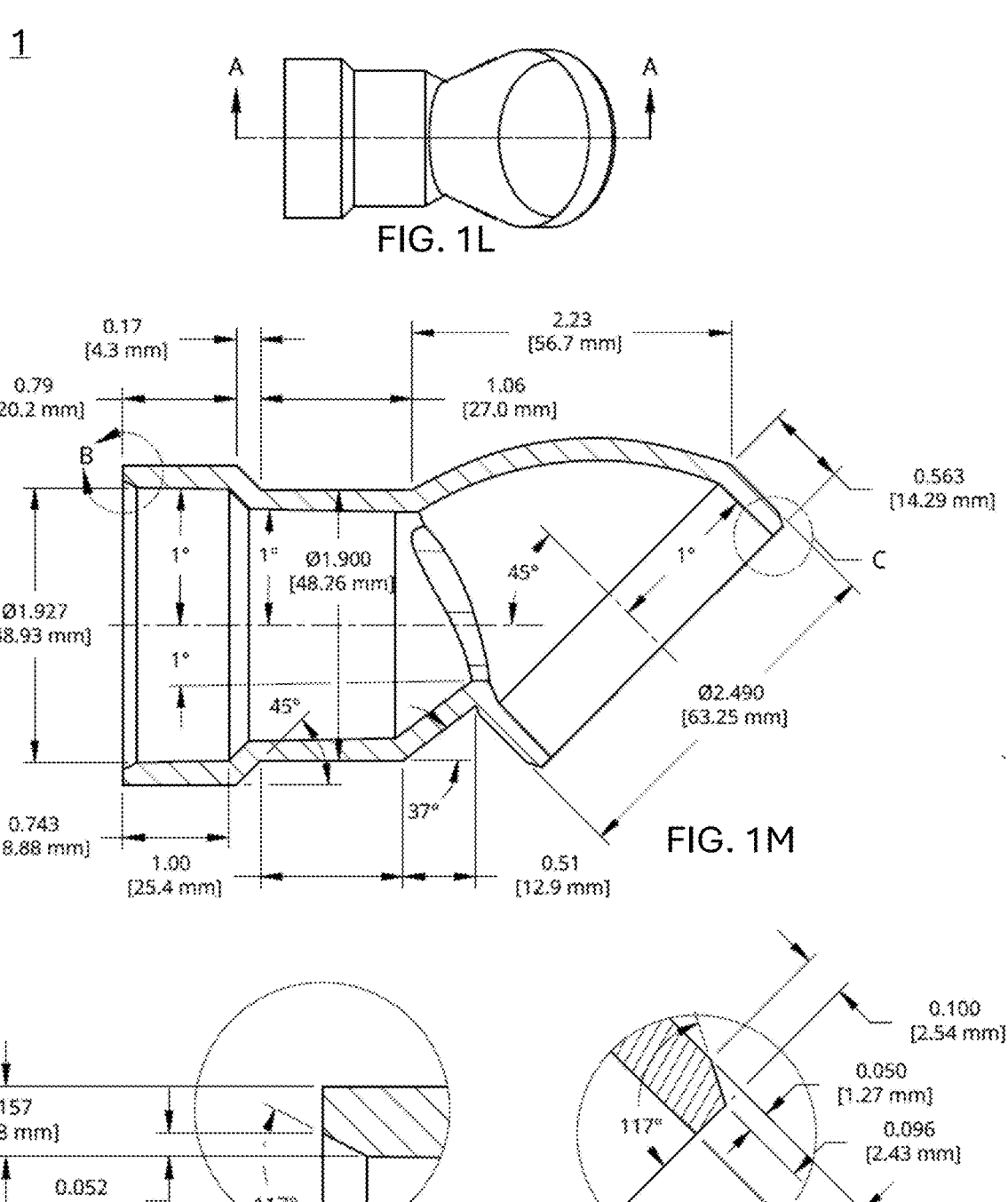
FIG. 1L is a top-view illustration of the male fitting.
FIG. 1M is a cross-sectional, side-view illustration of the male fitting, taken from line A-A of FIG. 1L.
FIG. 1N is a close-up illustration of Detail B, taken from FIG. 1M.
FIG. 1O is a close-up illustration of Detail C, taken from FIG. 1M.
Figures 1P, 1Q:
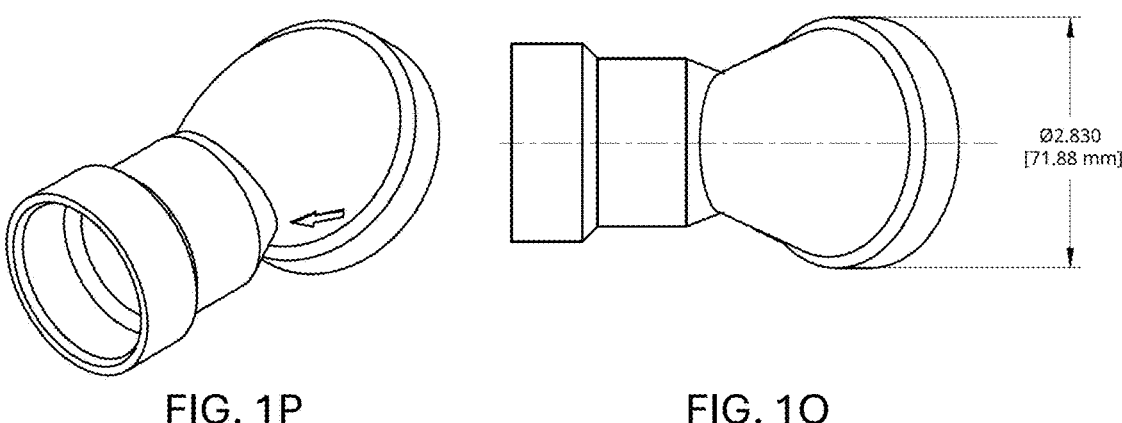
FIG. 1P is an elevated-view illustration of the female fitting in accordance with various embodiments of the present invention.
FIG. 1Q is a top-view illustration of the female fitting in accordance with various embodiments of the present invention.
Figures 1R, 1S:
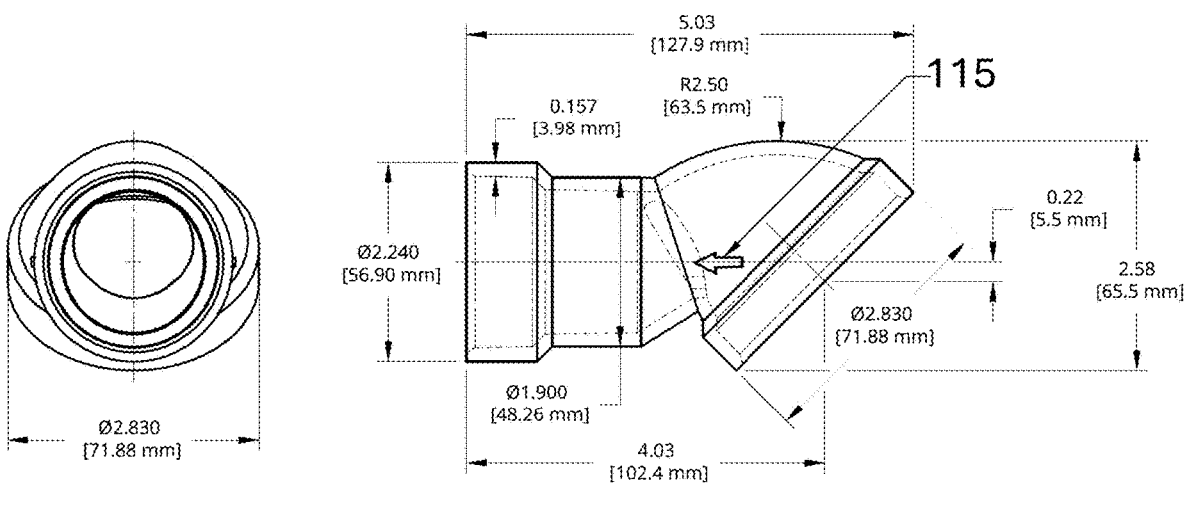
FIG. 1R is a front-view illustration of the female fitting in accordance with various embodiments of the present invention.
FIG. 1S is a side-view illustration of the female fitting in accordance with various embodiments of the present invention.
Figure 1T:
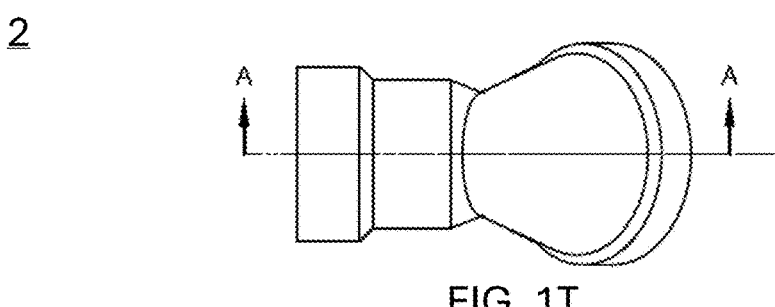
FIG. 1T is a top-view illustration of the male fitting.
Figure 1U:
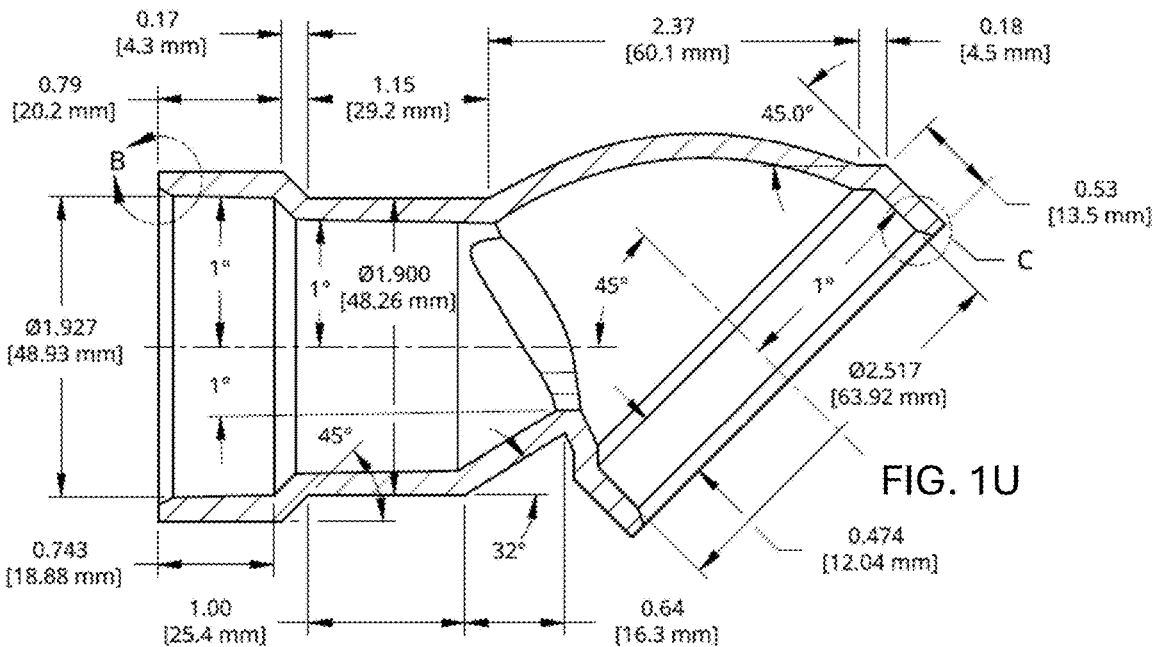
FIG. 1U is a cross-sectional, side-view illustration of the male fitting, taken from line A-A of FIG. 1T.
Figures 1V, 1W:
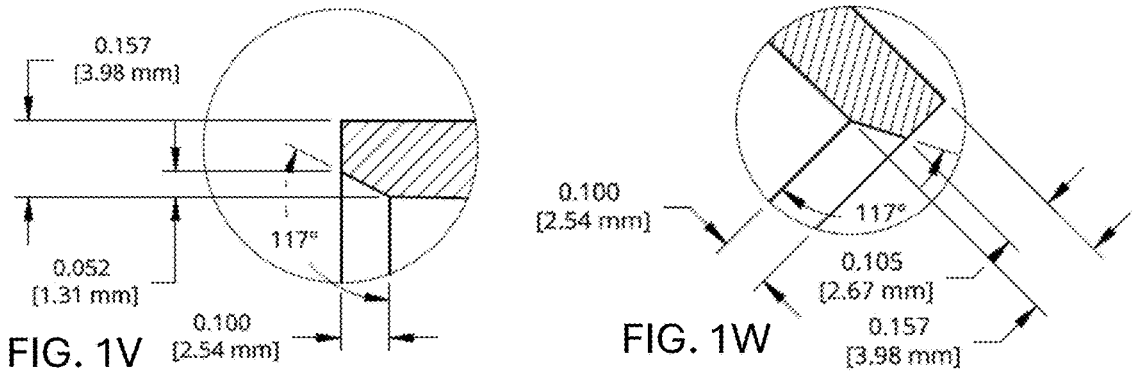
FIG. 1V is a close-up illustration of Detail B, taken from FIG. 1U.
FIG. 1W is a close-up illustration of Detail C, taken from FIG. 1U.
Figure 2A:
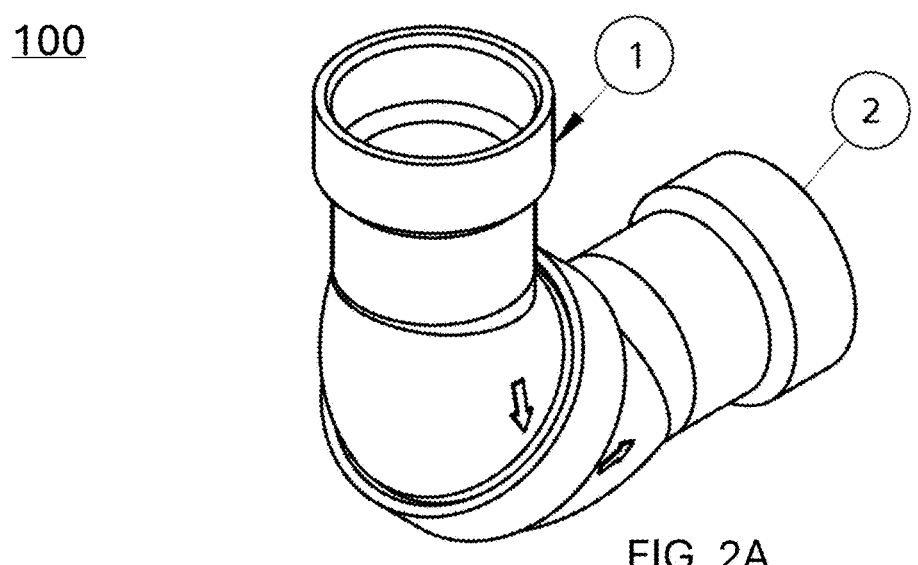
FIG. 2A is an elevated-view illustration of a multi-directional plumbing system in accordance with various embodiments of the present invention, depicting a male fitting connected with a female fitting to create a 90 degree orientation.
Figure 3A:
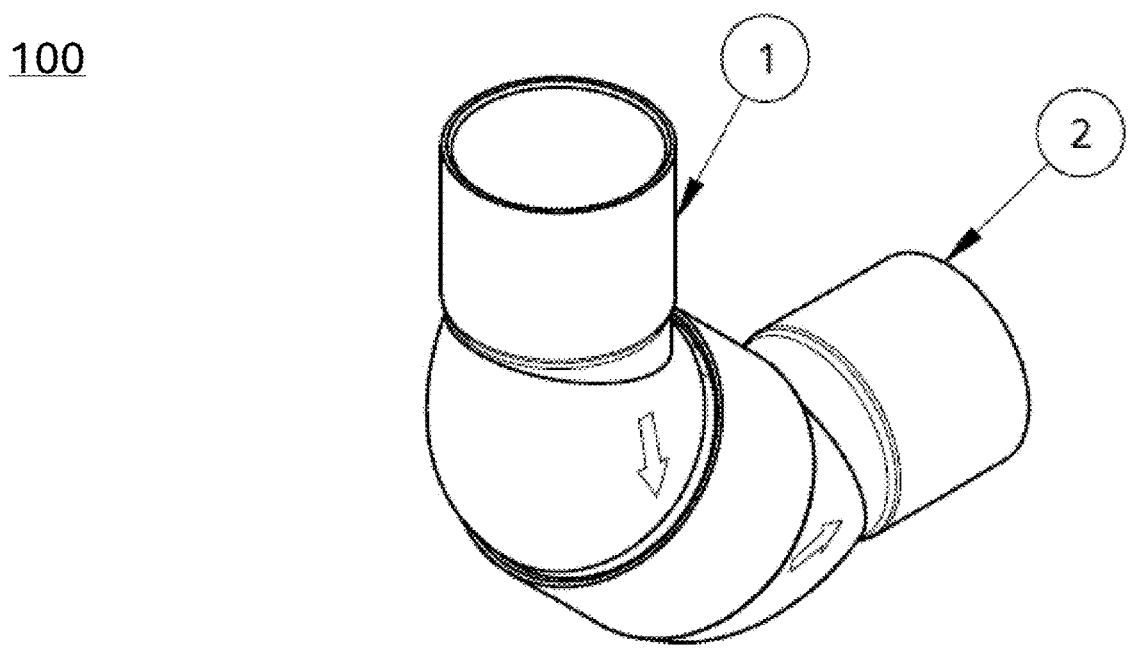
FIG. 3A is an elevated-view illustration of a multi-directional plumbing system in accordance with various embodiments of the present invention, depicting a male fitting connected with a female fitting to create a 90 degree orientation.
Figure 3B:
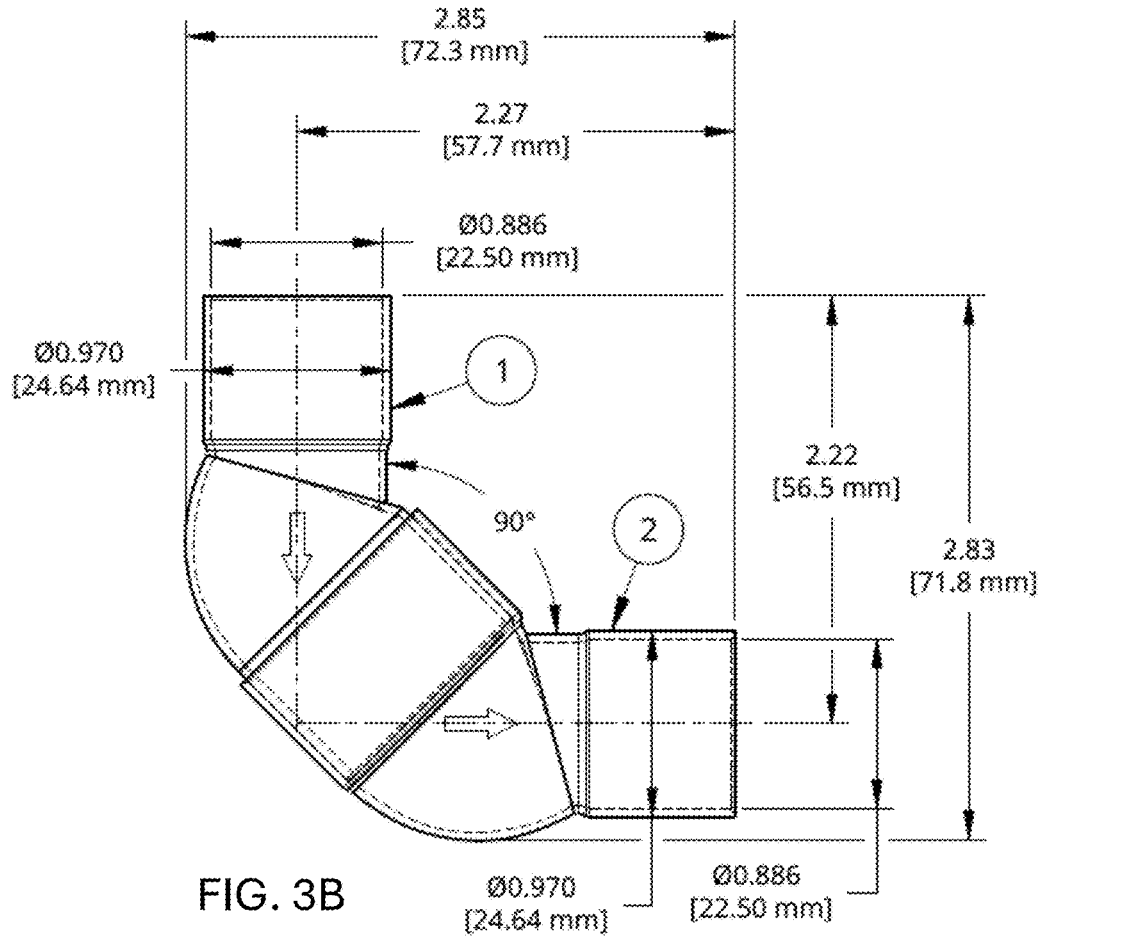
FIG. 3B is a side-view illustration of the multi-directional plumbing system in accordance with various embodiments of the present invention, depicting the male fitting connected with the female fitting to create a 90 degree orientation.
Figure 3C:
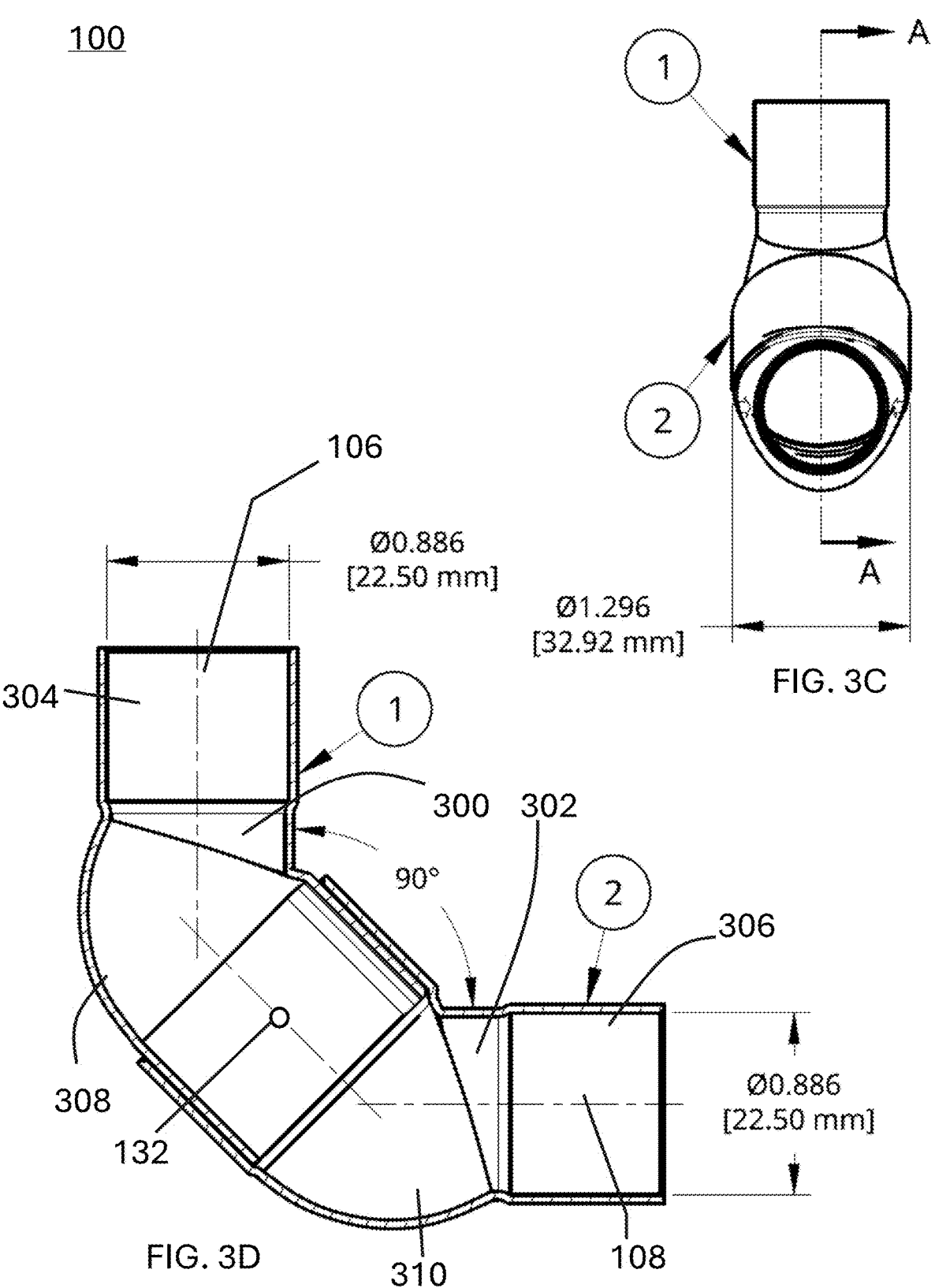
FIG. 3C is a front-view illustration of the multi-directional plumbing system in accordance with various embodiments of the present invention.
Figures 3E, 3F, 3G:
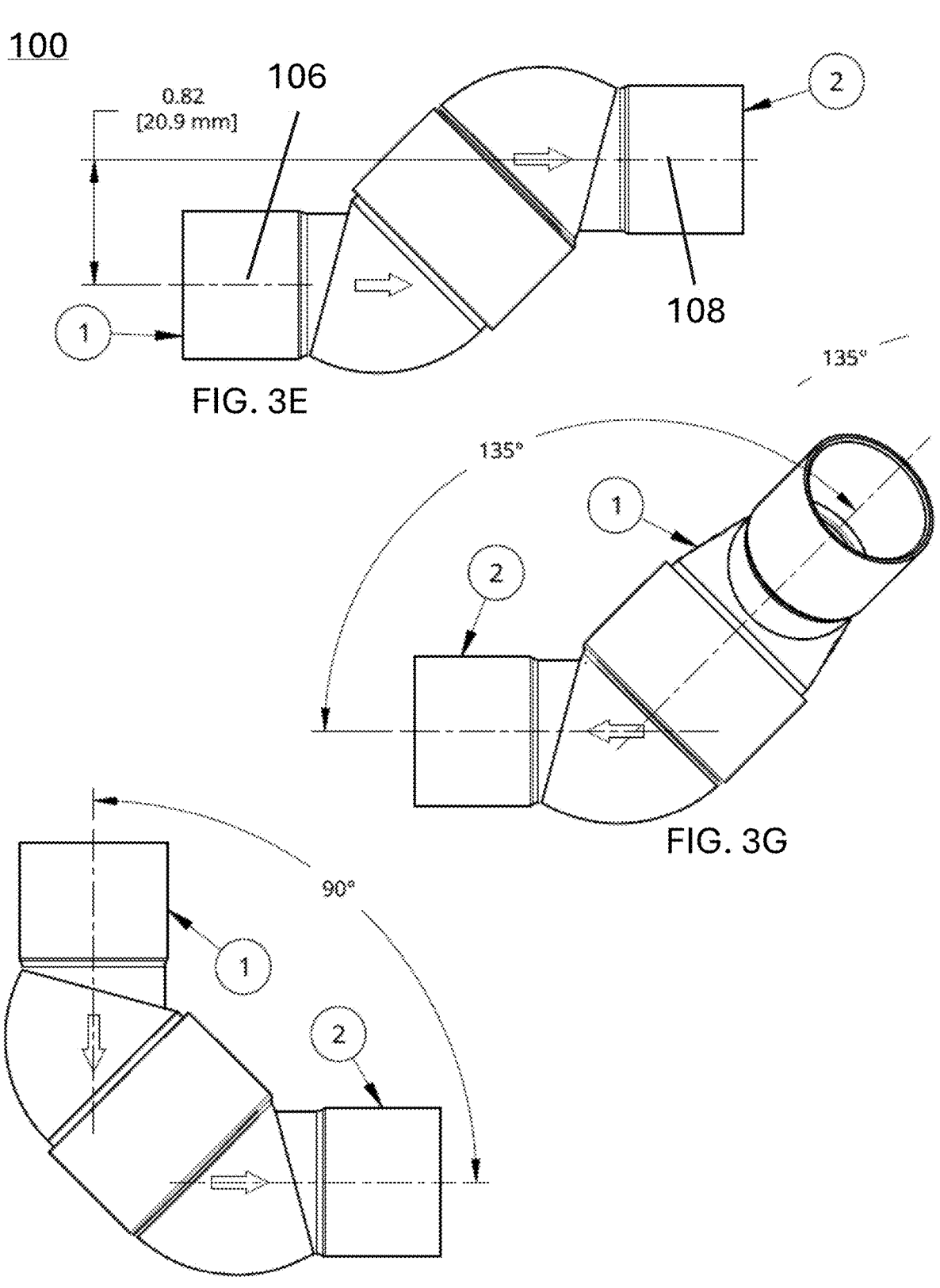
FIG. 3E is a side-view illustration of the multi-directional plumbing system, depicting the male fitting connected with the female fitting to create the linear orientation.
FIG. 3F is a side-view illustration of the multi-directional plumbing system, depicting the male fitting connected with the female fitting to create a 90 degree orientation.
FIG. 3G is a side-view illustration of the multi-directional plumbing system, depicting the male fitting connected with the female fitting to create a 135 degree orientation.
Figures 3L, 3M, 3N, 3O:
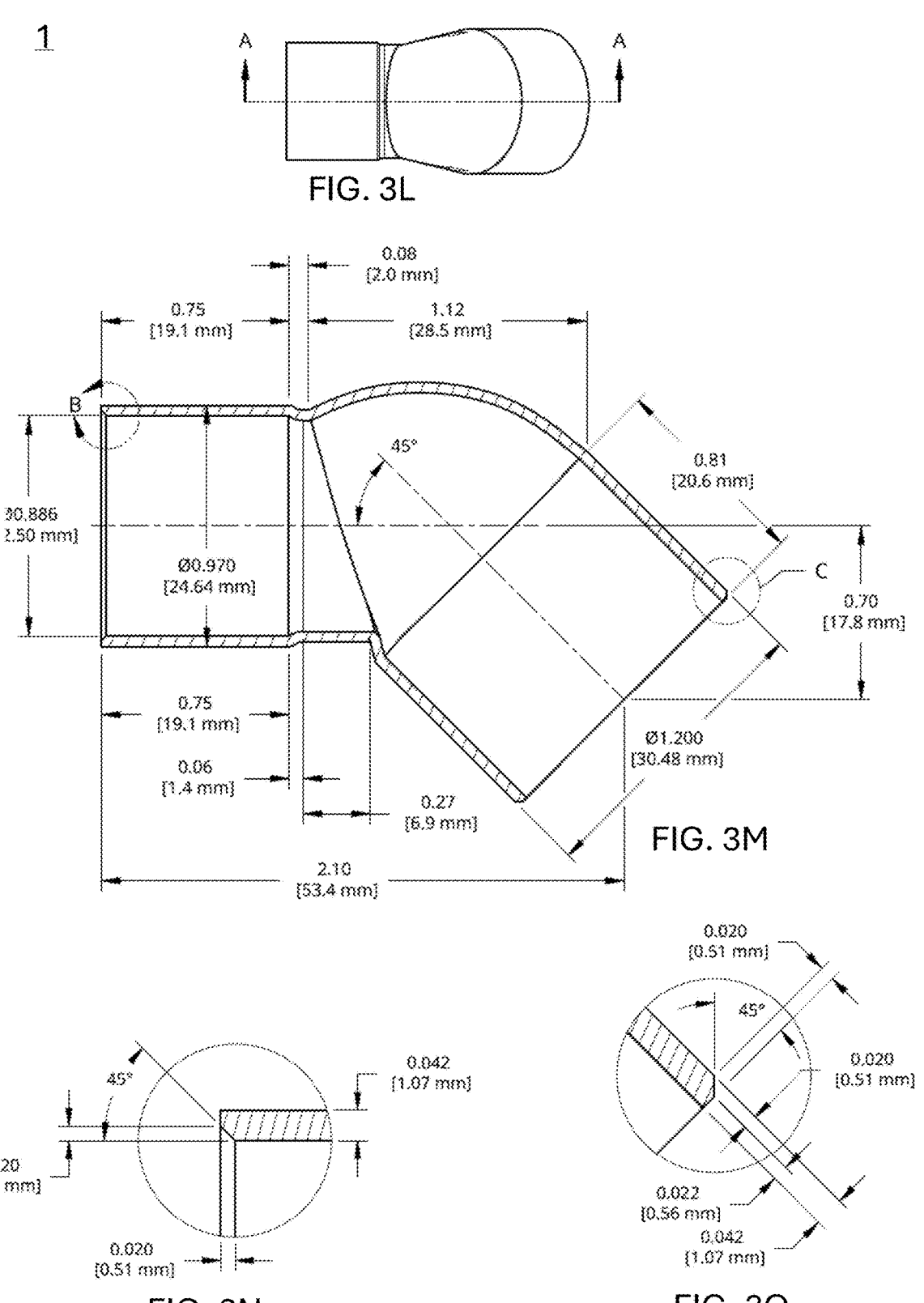
FIG. 3L is a top-view illustration of the male fitting.
FIG. 3M is a cross-sectional, side-view illustration of the male fitting, taken from line A-A of FIG. 3L.
FIG. 3N is a close-up illustration of Detail B, taken from FIG. 3M.
FIG. 3O is a close-up illustration of Detail C, taken from FIG. 3M.
Figure 3P:
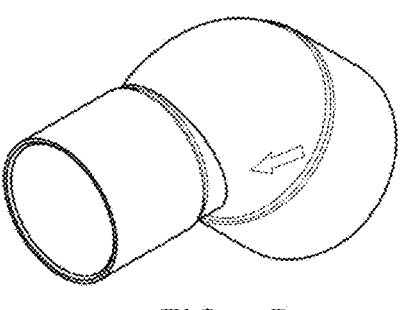
FIG. 3P is an elevated-view illustration of the female fitting in accordance with various embodiments of the present invention.
Figure 3Q:
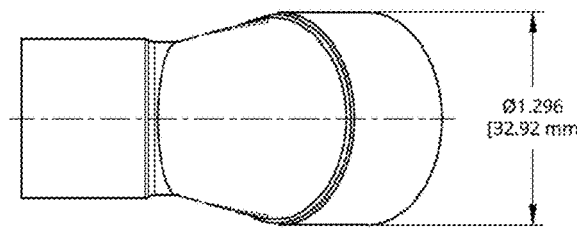
FIG. 3Q is a top-view illustration of the female fitting in accordance with various embodiments of the present invention.
Figure 3R:
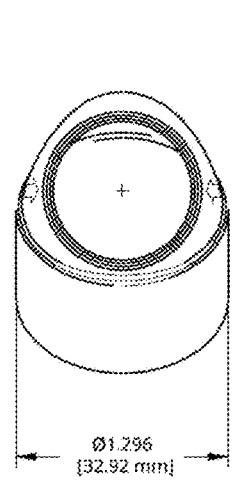
FIG. 3R is a front-view illustration of the female fitting in accordance with various embodiments of the present invention.
Figure 3S:
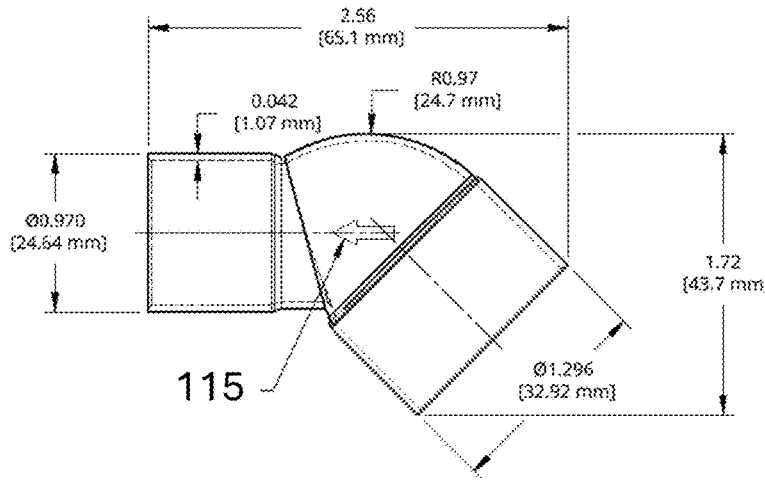
FIG. 3S is a side-view illustration of the female fitting in accordance with various embodiments of the present invention.
Figures 3T, 3U, 3V, 3W:
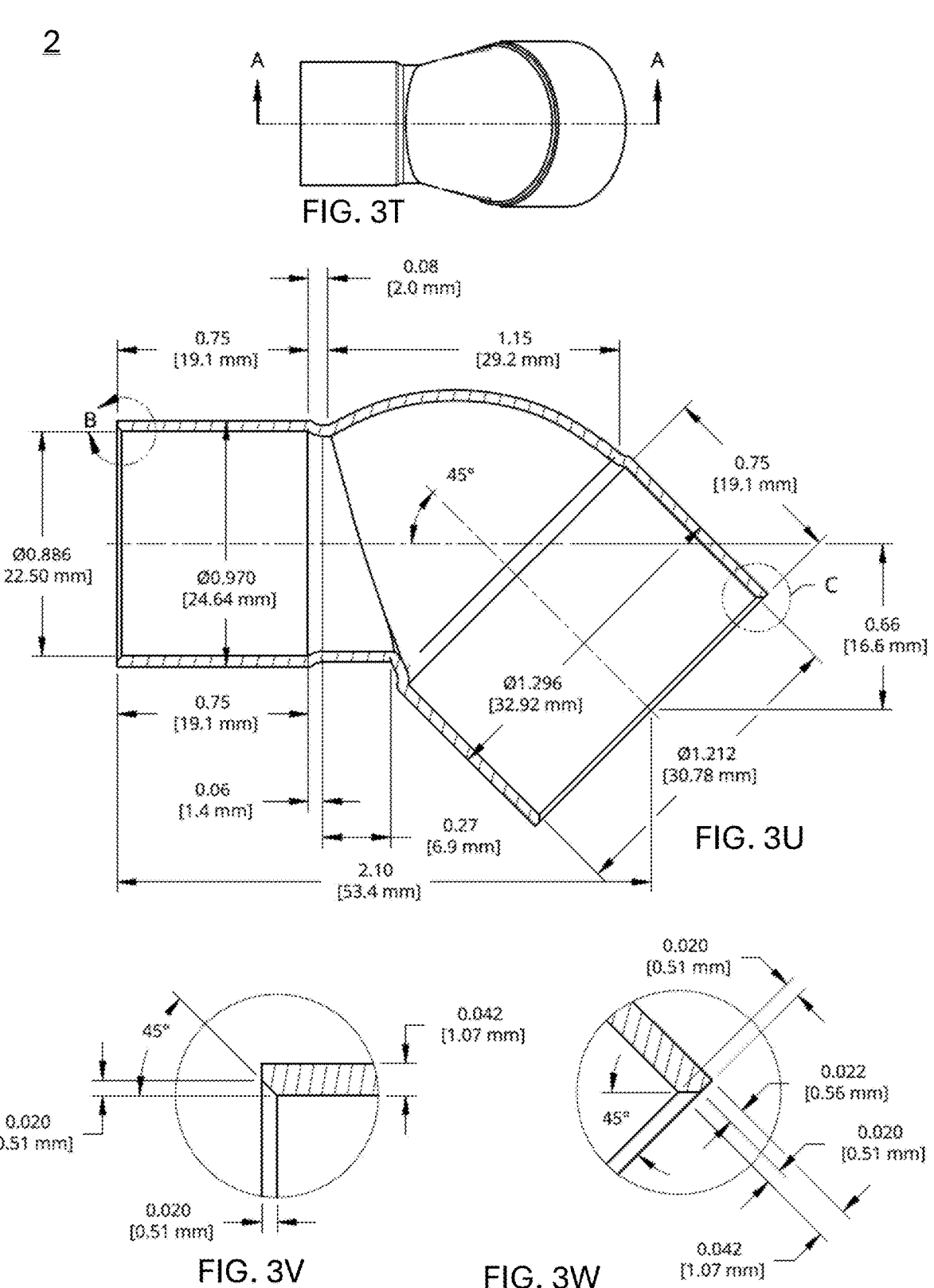
FIG. 3T is a top-view illustration of the male fitting.
FIG. 3U is a cross-sectional, side-view illustration of the male fitting, taken from line A-A of FIG. 3T.
FIG. 3V is a close-up illustration of Detail B, taken from FIG. 3U.
FIG. 3W is a close-up illustration of Detail C, taken from FIG. 3U.

It should be understood that a first aspect of the system is depicted in FIGS. 1A through 1W, while FIGS. 2A through 2W depict a second aspect of the system, and FIGS. 3A through 3W depict a third aspect of the system. Each aspect includes both the male fitting 1 and female fitting 2, with some minor distinctions as referenced below. It should also be noted that although the figures include measurements in both inches and millimeters to provide dimensions for one embodiment, the invention is not intended to be limited thereto as the dimensions can be altered to accommodate fittings of different sizes as desired. Thus, the dimensions are provided to illustrate one non-limiting example of the invention that is sized to accommodate and mate with existing plumbing pipes that are commonly found on the shelf at most building supply retailers.

As shown in FIG. 1D, the male fitting 1 includes a male coupling section 101 with a proximal male end 102 that is formed to be selectively secured into a proximal female end 104 of the female fitting 2. Thus, the female fitting 2 similarly includes a female coupling section 103 that terminates in the proximal female end 104, the proximal female end 104 being formed to receive and affix with the proximal male end 102. The male fitting 1 includes a central male longitudinal axis 106 while the female fitting 2 includes a central female longitudinal axis 108. Each of the proximal male end 102 and proximal female end 104 are formed at angles from the longitudinal axes 106 and 108. The ends 102 and 104 each have an end axis (i.e., a first end axis 112 and second end axis 119, respectively) passing therethrough at a coupling angle 110 that is offset from the longitudinal axes 106 and 108. The coupling angle 110 allows for the fittings 1 and 2 to be rotated with respect to one another at a variety of selective angles. Desirably, the coupling angle 110 is approximately 45 degrees to allow for the angular rotations as described herein.

For example and as shown in FIG. 1E, in this first aspect, the male fitting 1 can be positioned and affixed to the female fitting 2 in a linear orientation such that the central male longitudinal axis 106 is aligned with the central female longitudinal axis 108. Alternatively and as shown in FIG. 1F, the male fitting 1 can be positioned and affixed to the female fitting 2 in a 90 degree orientation, while FIG. 1G depicts the male fitting 1 positioned and affixed to the female fitting 2 in a 135 degree orientation. Thus and as can be appreciated by those skilled in the art, the two fittings 1 and 2 can be positioned and affixed with respect to one another at any desired angle such that the longitudinal axes 106 and 108 reside between linear alignment (i.e., 180 degrees) and 90 degrees.

Each of the male 1 and female 2 fittings are devised to allow for the selective angles while also allowing for coupling with other external plumbing systems. For example and referring to FIG. 1C, the male fitting 1 includes a male elongated neck 105 extending from the male coupling section 101 that terminates in a distal male fitting end 120. Alternatively, the female fitting 2 includes a female elongated neck 107 extending from the female coupling section 103 that terminates in a distal female fitting end 122. In use, while the proximal ends 102 and 104 are connectable with one another, the distal ends 120 and 122 remain open to allow for connection with external plumbing. In one aspect, each of the distal ends 120 and 122 are preferably formed with female-shaped couplings that are sized and shaped to receive and affix with the external plumbing pipes or components. Thus and as can be appreciated by those skilled in the art, a plumber could slide a pipe or other fitting into either distal end 120 or 122 and selectively affix said pipe or fitting using an adhesive, wield or other fixture technique.

In some scenarios a plumber or user may not desire to position a pipe or fitting (as a male coupling) into the distal ends 120 or 122 and, instead, may prefer to affix a female end of an external pipe or fitting to either the male 1 or female fitting 2. Thus, in this aspect, each of the male elongated neck 105 and female elongated neck 107 have an external diameter that is consistent with traditional off the shelf plumbing components. In this scenario, a user could easily cut 109 through either elongated neck 105 or 107 to remove the respective distal end 120 or 122 (in essence creating a male fitting). In such an aspect, if the distal ends 120 or 122 were removed, the remaining elongated neck 105 or 107 extending from the coupling sections 101 or 103 are of sufficient length 111 and 113 that a standard female coupling or fitting can be affixed therewith. As a non-limiting example, the fittings 1 and 2 have elongated necks 105 and 107 with lengths between one half an inch and two inches and, desirably, between three quarters of an inch and one and one quarter of an inch. In another aspect, the length of the elongated necks 105 and 107 is approximately one inch.

For further understanding, FIGS. 1H through 1O depict various illustrations of the male fitting 1, while FIGS. 1P through 1W depict various illustrations of the female fitting 2. In some aspects and as shown in FIGS. 1B and 1K, a directional flow arrow 115 can be embossed, painted on, or otherwise formed on the fittings 1 and 2. The directional flow arrow 115 serves to provide indicia to a user so that they properly assembly the fittings in their plumbing project. While fluids are not as sensitive to internal coupling shapes, solid waste such as that found in a sewer line may possibly snag or become obstructed by shape deformities within the couplings. Thus, the directional flow arrows 115 are used to indicate that the proximal male end 102 is the outlet to minimize a likelihood of solid waste being inhibited within the coupling.

As noted above, the male 1 and female 2 fittings of the system 100 can be modified slightly to provide for different features. For example, the first aspect as depicted in FIGS. 1A through 1W includes coupling sections 101 and 103 with pinched necks. The pinched necks 130 are depicted in FIG.

1D and provide a transition from the elongated necks 105 and 107 to the coupling sections 101 and 103, respectively. The pinched necks 130, in effect, decrease the inner diameter between the elongated necks 105 and 107 and the coupling sections 101 and 103, respectively. By virtue of the pinched necks 130 and decreased inner diameter, the center point 132 of each of the proximal male end 102 and proximal female end 104 lay together and align with the longitudinal axes 106 and 108. Thus, in this aspect, the male fitting 1 and female fitting 2 are capable of connecting in a straight linear orientation with aligned longitudinal axes 106 and 108 (as shown in FIGS. 1B through 1E). The aligned linear orientation allows for maintaining a linear coupling in situations where such a configuration is needed or desired.

Figure 2B:
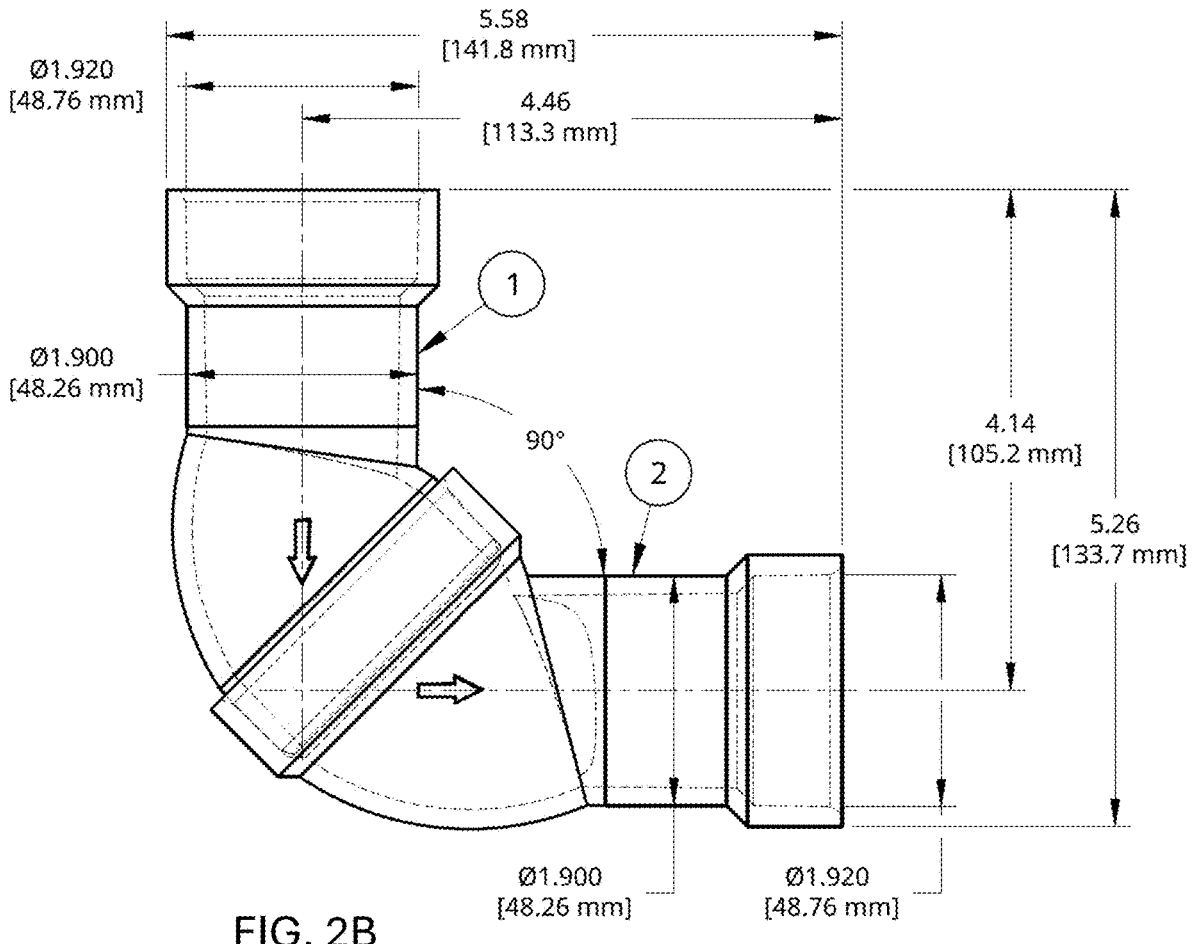
FIG. 2B is a side-view illustration of the multi-directional plumbing system in accordance with various embodiments of the present invention, depicting the male fitting connected with the female fitting to create a 90 degree orientation.
Figures 2C, 2D:
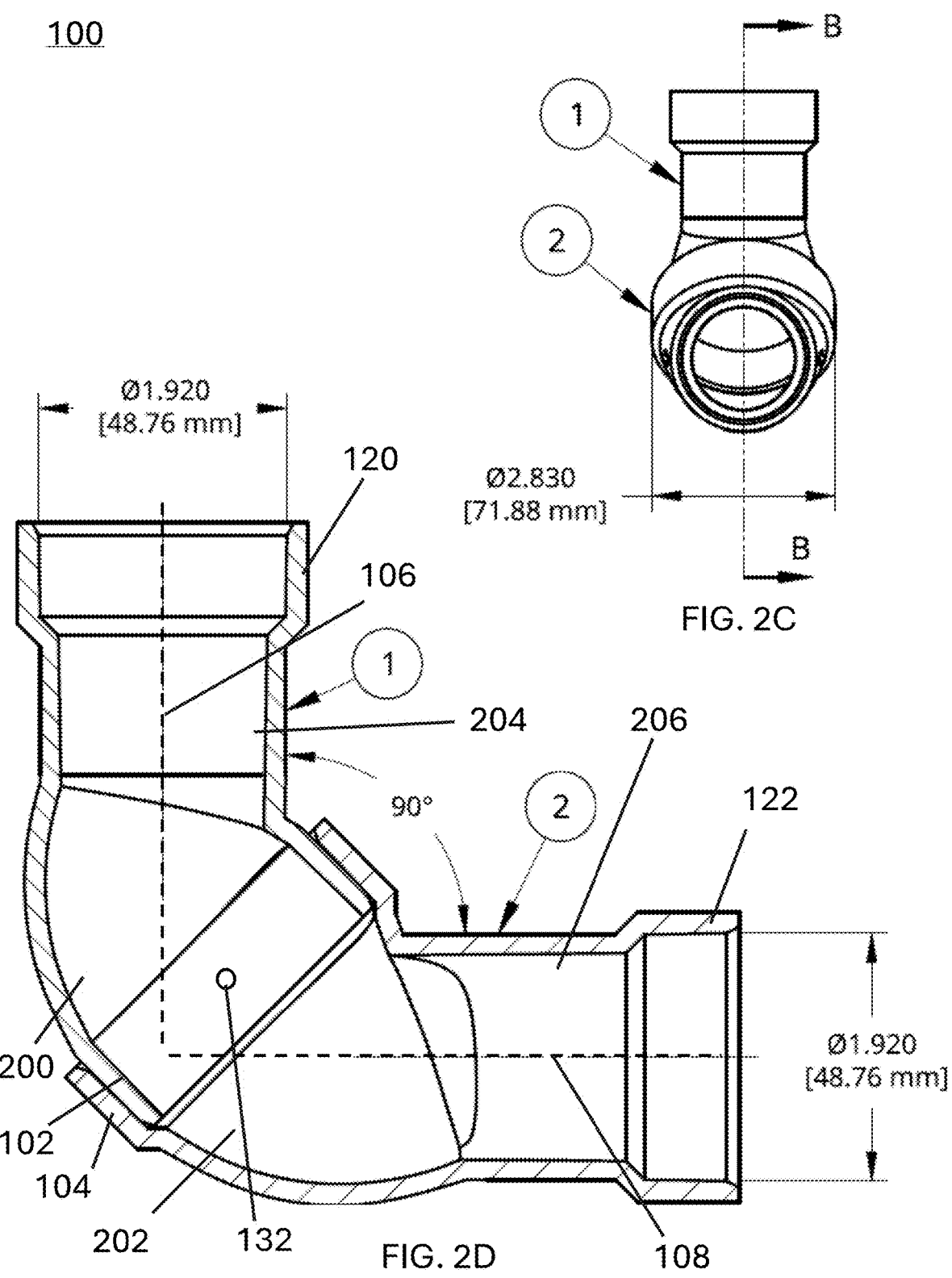
FIG. 2C is a front-view illustration of the multi-directional plumbing system in accordance with various embodiments of the present invention.
FIG. 2D is a cross-sectional, side-view illustration of the multi-directional plumbing system, taken from line B-B of FIG. 2C.
Figures 2E, 2F, 2G:
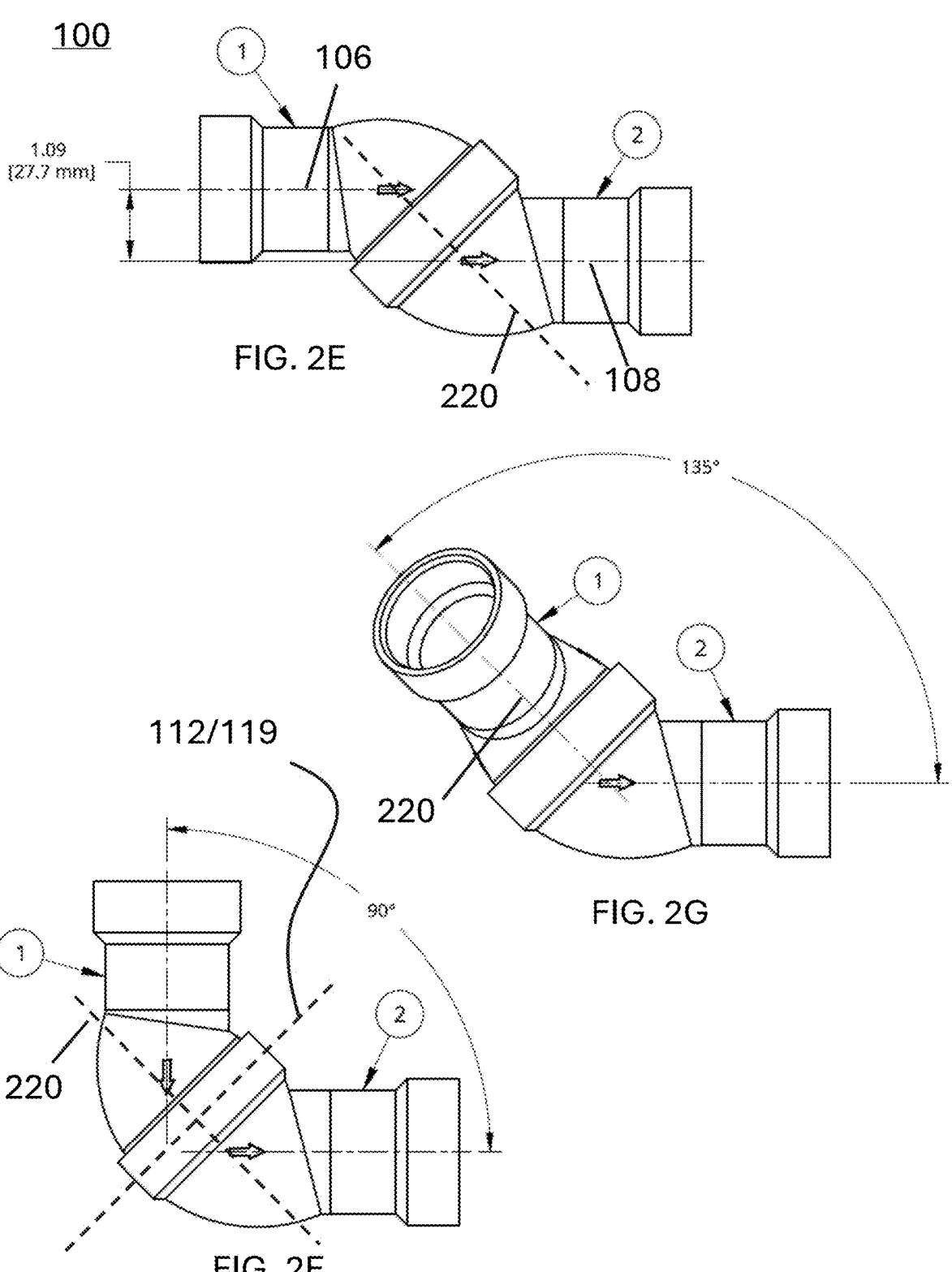
FIG. 2E is a side-view illustration of the multi-directional plumbing system, depicting the male fitting connected with the female fitting to create the linear orientation.
FIG. 2F is a side-view illustration of the multi-directional plumbing system, depicting the male fitting connected with the female fitting to create a 90 degree orientation.
FIG. 2G is a side-view illustration of the multi-directional plumbing system, depicting the male fitting connected with the female fitting to create a 135 degree orientation.

The first aspect is to be contrasted with that of the second aspect of the system 100, as depicted in FIGS. 2A through 2W. As was the case above, the second aspect similarly has a male fitting 1 and a female fitting 2, with many of the same features and components. Notably and as depicted in FIG. 2D, each of the male coupling section 200 and female coupling section 202 are shaped differently than those in the first aspect. In this aspect and as depicted, there is no pinched neck section separating the coupling sections 200 and 202 from the adjacent elongated necks 204 and 206. Without the pinched neck section, the inner diameter is maintained passing between the male 1 and female fittings 2. In order to accommodate this configuration, the coupling sections 200 and 202 are formed such that when the fittings 1 and 2 are connected with one another, the center point 132 of each of the proximal male end 102 and proximal female end 104 are unaligned with the longitudinal axes 106 and 108. As shown in FIG. 2E, due to the misalignment, the longitudinal axes 106 and 108 are offset from one another when the fittings 1 and 2 are positioned in the linear orientation. The aspect as depicted in FIGS. 2A through 2W is desirable in that it still allows for a linear orientation while avoiding pinched neck sections (as found in aspect 1 as illustrated in FIGS. 1A through 1W) which could conceivably snag and inhibit solid waste. Thus, the fitting in ABS or a waste pipe is drawn a bit differently than PVC and copper as it is used in not only vent lines but for moving waste. In this aspect, the fitting needs to be as non-restrictive as possible to avoid trapping waste. To limit such, the angle of the fitting is be a bit different than those made of other materials. Because of this, the fitting does not serve as effectively as a linear or straight coupling where straight pipe connections are a must. Additionally, without the pinched neck section, fluid flow is maintained throughout the joint without reducing fluid pressure passing therethrough. Further and as shown in FIGS. 2E through 2G, the fittings 1 and 2 also have a first end axis 112 and second end axis 119 (shown in FIG. 2F) and are similarly rotatable around a shared and fixed concentric rotational axis 220 throughout a variety of angles to allow for selective positioning and fixture in any plumbing project.

In this second aspect and as shown in FIG. 2D, the necks 204 and 206 are similarly elongated. As was the case above, the elongated necks 204 and 206 are sufficiently long to allow a user to selectively remove the distal ends 120 and 122 (e.g., cutting them off) and use the elongated necks 204 and 206 as male couplings. For further understanding, FIGS. 2H through 2O depict various illustrations of the male fitting 1, while FIGS. 2P through 2W depict various illustrations of the female fitting 2.

The first and second aspects are to be contrasted with that of the third aspect of the system 100, as depicted in FIGS. 3A through 3W. As was the case above, the third aspect similarly has a male fitting 1 and a female fitting 2, with many of the same features and components. Notably, while the first and second aspects included elongated necks, the third aspects includes a truncated neck. As shown in FIG. 3D, the truncated neck 300 and 302 provides a transition from the distal ends 304 and 306 to the coupling sections 308 and 310. With a truncated neck 300 or 302 instead of an elongated neck, the necessary distance to make a 90-degree turn in a plumbing project can be considerably reduced. For example and as shown in FIG. 3B, a 90-degree angle can be accomplished in less than three inches, whereas the inclusion of the elongated neck requires closer to five inches (as shown in FIG. 2B).

As was the case above and as shown in FIG. 3E, the third aspect includes longitudinal axes 106 and 108 that are offset from one another when the fittings 1 and 2 are positioned in the linear orientation. Similarly and as shown in FIG. 3D, the offset is a result of the center point 132 being unaligned with the longitudinal axes 106 and 108.

As can be seen in FIG. 3D and due to the offset axes 106 and 108, the third aspect does not require the pinched neck section. As such, without the pinched neck section, the inner diameter is maintained when passing between the male 1 and female fittings 2. This aspect is desirable in that it still allows for a generally linear orientation while avoiding the pinched neck sections. As was the case above, without the pinched neck section, fluid flow is maintained throughout the joint without reducing fluid pressure passing therethrough. Further and as shown in FIGS. 3E and 3G, the fittings 1 and 2 in this aspect are similarly rotatable throughout a variety of angles to allow for selective positioning and fixture in any plumbing project. For further understanding, FIGS. 3H through 3O depict various illustrations of the male fitting 1, while FIGS. 3P through 3W depict various illustrations of the female fitting 2. The third aspect lends itself well to copper and other fittings where wields are commonly employed and a user is unlikely to cut the fitting to accommodate alternative configurations.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A multi-directional plumbing system, comprising:
a male fitting, the male fitting having:
   a first distal end shaped as a first cylindrical female coupling;
   a first neck extending from the first distal end;
   a first coupling section transitioning from the neck to a first proximal end, the first proximal end being shaped as a first cylindrical male coupling;
   wherein a first longitudinal axis passes through a center of the neck;
   wherein a first end axis passes through the first proximal end and crosses the first longitudinal axes such that a first coupling angle exists between the first longitudinal axis and the first end axis; and
   wherein the first coupling angle is approximately 45 degrees;
a female fitting, the female fitting having:
   a second distal end shaped as a second cylindrical female coupling;
   a second neck extending from the second distal end;
   a second coupling section transitioning from the second neck to a second proximal end, the second proximal end being shaped as a third cylindrical female coupling;
   wherein a second longitudinal axis passes through a center of the second neck;
   wherein a second end axis passes through the second proximal end and crosses the second longitudinal axes such that a second coupling angle exists between the second longitudinal axis and the second end axis; and
   wherein the second angle is approximately 45 degrees;
wherein each of the first and second necks have a neck length, each neck length being between one half an inch and two inches, thereby allowing a user to selectively cut off either the first or second distal ends, with each neck length having a sufficient length to selectively affix with a female coupling;
wherein each of the first and second proximal ends has a proximal end length, the proximal end lengths being of sufficient length to create a seal against one another when affixed to one another to form a joint; and
wherein each of the male coupling section and female coupling section are formed to have a bulbous shape, such that when connected to form the joint, fluid flow is maintained throughout the joint without reducing fluid pressure passing therethrough.

2. The multi-directional plumbing system as set forth in claim 1, wherein the first proximal end and second proximal end are connectable, such that when connected, the male fitting is rotatable with respect to the female fitting.

3. The multi-directional plumbing system as set forth in claim 2, wherein the male fitting is rotatable with respect to the female fitting such that an angle between the first longitudinal axis and second longitudinal axis is adjustable between 90 degrees and 180 degrees.

4. The multi-directional plumbing system as set forth in claim 3, wherein each of the first proximal end and second proximal end include a center point, such that when connected, the center points lay together while offset from the first and second longitudinal axes.

5. The multi-directional plumbing system as set forth in claim 4, wherein each of the first neck and second neck are truncated necks.

6. The multi-directional plumbing system as set forth in claim 2, wherein when the first proximal end and second proximal end are connected, the first cylindrical male coupling nests within the third cylindrical female coupling such that a shared and fixed concentric rotational axis passes through a center of each of the first cylindrical male coupling and the third cylindrical female coupling, about which each of the male fitting and female fitting rotate with respect to one another.

7. The multi-directional plumbing system as set forth in claim 1, wherein each of the male coupling section and female coupling section have an exterior surface, such that the exterior surface of the male coupling section has a first arrow indicia pointing toward the first proximal end, and wherein the exterior surface of the female coupling section has a second arrow indicia pointing away the second proximal end, such that when the first proximal end is positioned within the second proximal end, the first and second arrow indicia indicate fluid flow to minimize leakage and waste inhibition through the joint formed therebetween.

* * * * *